US007961398B2

(12) United States Patent
Tocci

(10) Patent No.: US 7,961,398 B2
(45) Date of Patent: Jun. 14, 2011

(54) MULTIPLE IMAGE CAMERA AND LENS SYSTEM

(75) Inventor: Michael D. Tocci, Sandia Park, NM (US)

(73) Assignee: Contrast Optical Design & Engineering, Inc., Sandia Park, NM (US)

( * ) Notice: Subject to any disclaimer, the term of this patent is extended or adjusted under 35 U.S.C. 154(b) by 49 days.

(21) Appl. No.: 12/398,819

(22) Filed: Mar. 5, 2009

(65) Prior Publication Data

US 2009/0225433 A1 Sep. 10, 2009

Related U.S. Application Data

(60) Provisional application No. 61/034,031, filed on Mar. 5, 2008.

(51) Int. Cl.
*G02B 27/14* (2006.01)
(52) U.S. Cl. ........................................ 359/629; 359/631
(58) Field of Classification Search .................. 359/629, 359/634, 636–638, 640, 631, 726, 727
See application file for complete search history.

(56) References Cited

U.S. PATENT DOCUMENTS

| 347,451 | A | 8/1886 | Varing |
| 2,560,351 | A | 7/1951 | Kell et al. |
| 2,642,487 | A | 6/1953 | Schroeder |
| 2,971,051 | A | 2/1961 | Back |
| 3,202,039 | A | 8/1965 | De Lang et al. |
| 3,381,084 | A | 4/1968 | Wheeler |
| 3,601,480 | A | 8/1971 | Randall |
| 3,653,748 | A | 4/1972 | Athey |
| 3,659,918 | A | 5/1972 | Tan |
| 3,668,304 | A | 6/1972 | Eilenberger |
| 3,720,146 | A | 3/1973 | Yost |
| 3,802,763 | A | 4/1974 | Cook et al. |

(Continued)

FOREIGN PATENT DOCUMENTS

EP 0484802 A2 5/1992

(Continued)

OTHER PUBLICATIONS

Aggarwal, Manoj , "Split Aperture Imaging for High Dynamic Range", *International Journal of Computer Vision* Jul. 17, 2004 , 7-17.

(Continued)

*Primary Examiner* — Alicia M Harrington
(74) *Attorney, Agent, or Firm* — Janeen Vilven-Doggett; Philip D. Askenazy; Peacock Myers, P.C.

(57) ABSTRACT

A system for simultaneously producing multiple images substantially identical images on multiple separate detector planes is disclosed. A reflective spatially beam-splitting element preferably comprising multiple reflective areas is preferably placed at a location substantially coincident with the pupil or aperture of the system. In non-diffraction limited systems, each area preferably comprises an actual cross section that is circular or has the rotational symmetry (or a multiple thereof) of the number of images to be formed. In diffraction limited systems, all of the areas preferably comprise actual cross sections that have the same shape, size and orientation with respect to the incoming optical beam. Each individual actual cross section may be due to the shape of each area, optionally in combination with a mask. Appropriate selection of filters enables real-time multi-spectral scientific imaging, imaging polarimetry, or high dynamic range imaging (HDRI) for photography and cinematography, even with a moving camera and/or moving subjects.

13 Claims, 29 Drawing Sheets

U.S. PATENT DOCUMENTS

| | | |
|---|---|---|
| 3,945,034 A | 3/1976 | Suzuki |
| 4,009,941 A | 3/1977 | Verdijk et al. |
| 4,072,405 A | 2/1978 | Ozeki |
| 4,084,180 A | 4/1978 | Stoffels et al. |
| 4,134,683 A | 1/1979 | Goetz et al. |
| 4,268,119 A | 5/1981 | Hartmann |
| 4,395,234 A | 7/1983 | Shenker |
| 4,486,069 A | 12/1984 | Neil et al. |
| 4,555,163 A | 11/1985 | Wagner |
| 4,786,813 A | 11/1988 | Svanberg et al. |
| 4,805,037 A | 2/1989 | Noble et al. |
| 4,916,529 A | 4/1990 | Yamamoto et al. |
| 4,933,751 A | 6/1990 | Shinonaga et al. |
| 5,024,530 A | 6/1991 | Mende |
| 5,093,563 A | 3/1992 | Small et al. |
| 5,134,468 A | 7/1992 | Ohmuro |
| 5,153,621 A | 10/1992 | Vogeley |
| 5,155,623 A | 10/1992 | Miller et al. |
| 5,194,959 A | 3/1993 | Kaneko et al. |
| 5,386,316 A | 1/1995 | Cook |
| 5,642,191 A | 6/1997 | Mende |
| 5,729,011 A | 3/1998 | Sekiguchi |
| 5,734,507 A | 3/1998 | Harvey |
| 5,801,773 A | 9/1998 | Ikeda |
| 5,835,278 A | 11/1998 | Rubin et al. |
| 5,856,466 A | 1/1999 | Cook et al. |
| 5,900,942 A | 5/1999 | Spiering |
| 5,926,283 A | 7/1999 | Hopkins |
| 5,929,908 A | 7/1999 | Takahashi et al. |
| 6,011,876 A | 1/2000 | Kishner |
| 6,215,597 B1 | 4/2001 | Duncan et al. |
| 6,646,716 B1 | 11/2003 | Ramanujan et al. |
| 6,801,719 B1 | 10/2004 | Szajewski et al. |
| 6,856,466 B2 | 2/2005 | Tocci |
| 7,068,890 B2 | 6/2006 | Soskind et al. |
| 7,084,905 B1 | 8/2006 | Nayar et al. |
| 7,138,619 B1 | 11/2006 | Ferrante et al. |
| 7,177,085 B2 | 2/2007 | Tocci et al. |
| 7,283,307 B2 | 10/2007 | Couture et al. |
| 7,397,509 B2 | 7/2008 | Krymski |
| 7,405,882 B2 | 7/2008 | Uchiyama et al. |
| 7,714,998 B2 * | 5/2010 | Furman et al. ............ 356/237.2 |
| 7,719,674 B2 * | 5/2010 | Furman et al. ............ 356/237.4 |
| 2002/0089765 A1 * | 7/2002 | Nalwa .......................... 359/725 |
| 2003/0016334 A1 | 1/2003 | Weber et al. |
| 2003/0072011 A1 | 4/2003 | Shirley |
| 2004/0119020 A1 | 6/2004 | Bodkin |
| 2004/0125228 A1 | 7/2004 | Dougherty |
| 2005/0001983 A1 | 1/2005 | Weber et al. |
| 2005/0041113 A1 | 2/2005 | Nayar et al. |
| 2005/0099504 A1 | 5/2005 | Nayar |
| 2005/0168578 A1 | 8/2005 | Gobush |
| 2005/0212827 A1 | 9/2005 | Goertzen |
| 2005/0219659 A1 | 10/2005 | Quan |
| 2006/0061680 A1 | 3/2006 | Madhaven et al. |
| 2006/0184040 A1 | 8/2006 | Keller et al. |
| 2006/0209204 A1 | 9/2006 | Ward |
| 2006/0221209 A1 | 10/2006 | McGuire et al. |
| 2006/0262275 A1 | 11/2006 | Domroese et al. |
| 2007/0025717 A1 | 2/2007 | Raskar et al. |
| 2007/0086087 A1 | 4/2007 | Dent et al. |
| 2007/0189750 A1 | 8/2007 | Wong et al. |
| 2008/0013051 A1 | 1/2008 | Glinksi et al. |
| 2008/0055683 A1 | 3/2008 | Choe |
| 2008/0094486 A1 | 4/2008 | Fuh et al. |
| 2008/0112651 A1 | 5/2008 | Cho et al. |
| 2008/0198235 A1 | 8/2008 | Chen et al. |

FOREIGN PATENT DOCUMENTS

| | | |
|---|---|---|
| JP | 60-213178 | 10/1985 |
| JP | 06-335006 | 12/1994 |
| KR | 1996-014482 | 12/1998 |

OTHER PUBLICATIONS

, "Flux Data Incorporated", http://web.archive.org/web/20080113023949/www.fluxdata.com/prod... Jan. 30, 2008 , 7.

* cited by examiner

OBJ: -1.6000, 1.2000 DEG

IMA: -2.921, 2.351 MM

OBJ: 0.0000, 1.2000 DEG

IMA: -0.065, 2.244 MM

OBJ: 1.6000, 1.2000 DEG

IMA: 2.818, 2.152 MM

OBJ: -1.6000, 0.0000 DEG

IMA: -2.855, 0.108 MM

OBJ: 0.0000, 0.0000 DEG

IMA: 0.001, 0.001 MM

OBJ: 1.6000, 0.0000 DEG

IMA: 2.885, -0.091 MM

OBJ: -1.6000, -1.2000 DEG

IMA: -2.772, -2.125 MM

OBJ: 0.0000, -1.2000 DEG

IMA: 0.084, -2.233 MM

OBJ: 1.6000, -1.2000 DEG

IMA: 2.967, -2.324 MM

MULTIPLE IMAGE CAMERA AND LENS SYSTEM

CROSS-REFERENCE TO RELATED APPLICATIONS

This application claims priority to and the benefit of filing of U.S. Provisional Patent Application Ser. No. 61/034,031, entitled "Multiple Image Camera and Lens System Suitable for High-Resolution Digital Imaging And Cinematography", filed on Mar. 5, 2008, which is incorporated herein by reference.

BACKGROUND OF THE INVENTION

1. Field of the Invention (Technical Field)

Embodiments of the present invention relate generally to imaging systems and more particularly to an imaging system that produces multiple substantially identical images of a single object scene onto multiple sensor arrays. These images are each preferably formed on its sensor array in such a way that all of the multiple images, as seen by the multiple sensors, are substantially spatially identical. One aspect of one embodiment of the present invention provides for a multiple-imaging system for such fields as high resolution digital imaging, multi-spectral imaging and high-dynamic-range imaging, in which multiple images are each filtered differently and then the multiple images are compared and/or combined pixel-by-pixel. For these and other uses, it is important that the multiple images each be substantially spatially identical. The present invention preferably produces multiple, substantially spatially identical images simultaneously on separate detector planes.

2. Description of Related Art

Note that the following discussion refers to a number of publications and references. Discussion of such publications herein is given for more complete background of the scientific principles and is not to be construed as an admission that such publications are prior art for patentability determination purposes.

Devices and methods for producing multiple simultaneous images have been known for over 100 years. U.S. Pat. Nos. 4,072,405; 4,084,180; 4,268,119; 4,916,529; 5,024,530; 5,642,191; 5,729,011; 6,856,466; and 7,177,085 and U.S. Appl. No. 2007/0189750A1 each describe an apparatus and/or method for splitting an incoming beam using a refractive prism or prisms. The drawbacks of using a refractive prism assembly for splitting of an incoming beam are widely known and well documented, and they include introduction of aberrations, spectral dispersion errors, and total internal reflection problems when used with beams containing high-angle light. U.S. Pat. Nos. 5,835,278; 5,734,507; and 5,926,283 all teach of the specific advantages of using a reflective beam splitting element in multiple-image-forming devices.

U.S. Pat. Nos. 347,451; 3,720,146; 4,072,405; 4,084,180; 4,134,683; 4,268,119; 4,916,529; and 5,835,278 and the article by Aggarwal & Ahuja all show devices and methods that introduce a beam-splitting apparatus at a location that is not a pupil plane. The main advantage of placing the beam-splitting apparatus at a pupil plane is that light from all the different object field angles is spatially confined to a uniformly-illuminated area. Thus the action of beam-splitting can be performed in a way that produces evenly-illuminated multiple images. By indicating a beam-splitting location that is not a pupil, these prior patents necessarily introduce vignetting (an unwanted effect) into their multiple images. U.S. Pat. Nos. 5,194,959; 5,734,507; 5,926,283; and 7,177,085 all teach of the advantages of placing a beam-splitting element at a pupil plane in multiple-image-forming devices.

U.S. Pat. Nos. 3,720,146; 4,072,405; 4,084,180; 4,268,119; 4,786,813; 4,916,529; 5,153,621; 5,194,959; 5,734,507; and 7,177,085 and the article by Aggarwal & Ahuja all show devices and methods that introduce a beam-splitting apparatus at a location that has the light beams either converging or diverging. When different optical filters are to be used with the multiple images (as is almost always the case) it is advantageous to provide afocal beams (that is beams that are neither converging to nor diverging from a focus) before and/or after the beam-splitting apparatus, so that the optical filtering can be performed in collimated space. U.S. Pat. Nos. 5,153,621; 5,926,283; and 6,856,466 all teach of the advantages of placing a beam-splitting element in a light beam that is afocal before and/or after the beam-splitting apparatus, in multiple-image-forming devices.

U.S. Pat. Nos. 5,926,283 and 6,856,466 both teach of beam-splitting methods that form separate images on a single detector plane, and therefore they require the formation of a first, high-quality, real image at a plane co-incident with a field stop prior to the beam-splitting element. In fact, the designs presented by these two patents are completely dependent on this key component, as evidenced by this quote from U.S. Pat. No. 6,856,466: "Without this field stop, the spectral images would overlap at the detector plane rendering the system useless." U.S. Pat. Nos. 4,072,405; 4,084,180; 4,134,683; 4,268,119; 4,916,529; 5,835,278 all teach of optical systems that form multiple images on separate detector planes, without the need for forming a first, high-quality, real image at a plane co-incident with a field stop prior to the beam-splitting element.

U.S. Pat. Nos. 5,194,959; 5,926,283 and 6,856,466 and Jap. Pat. No. 60-213178 all teach of the importance of ensuring that all of the multiple images formed by the system are practically identical. However, these patents also fail to account for the differences in image formation properties that are induced by using sub-apertures that are oriented differently, with respect to the object and image planes, for the different multiple images.

No patent or prior literature is known that discloses or suggests a solution to the problems associated with introducing differently-shaped or differently-oriented or differently-sized sub-apertures into a pupil plane of a multiple imaging system. Neither can any patent or prior art be found that teaches of possible solutions to these very real problems. In fact, much of the prior art regarding multiple imaging systems, including U.S. Pat Nos. 5,024,530; 5,194,959; 5,642,191; 5,734,507; 5,835,278; 5,926,283; 6,856,466; and 7,177,085 and the article by Aggarwal and Ahuja, all teach specifically against using round sub-apertures, through the use of sharp-cornered, pyramid-shaped, beam-splitting apparatuses and through specific descriptions and drawings of rectangular and/or triangular and/or quarter-round aperture shapes.

SUMMARY OF THE INVENTION

The present invention is a method for producing multiple non-diffraction limited images, the method comprising the steps of splitting an optical beam into a plurality of images using a plurality of beam-splitting elements, the beam-splitting elements comprising actual cross sections each having substantially the same size, shape, and orientation and each having at least the symmetry of the number of the plurality of images; and imaging the images using a plurality of imaging systems. The splitting step preferably comprises splitting the beam substantially at an aperture stop or pupil of an entire optical system. Each beam splitting element preferably comprises a reflective element comprising a flat mirror or a facet of a reflective prism. The splitting step optionally comprises partially masking at least one beam splitting element. Each imaging system is preferably rotationally symmetric about its optical axis and is disposed on-axis with respect to a corresponding beam-splitting element. The plurality of imaging systems are preferably substantially identical and the plurality of images are preferably substantially identical. The method optionally further comprises the step of filtering at least one of the plurality of images through a neutral density filter, a polarizing filter and/or a wavelength filter. Distances between the beam-splitting elements and corresponding image planes are optionally different.

The present invention is also a non-diffraction limited system for producing multiple images, the system comprising a plurality of beam splitting elements comprising actual cross sections each having substantially the same size, shape, and orientation and each having the symmetry of the number of the plurality of beam splitting elements; and a plurality of imaging systems and detectors for imaging a plurality of images. The beam splitting elements are preferably disposed at an aperture stop or pupil of the system. Each of the beam splitting elements is preferably reflective and comprises a flat mirror or a facet of a prism. The system optionally further comprises at least one mask for masking the beam splitting elements. Each imaging system is rotationally symmetric about its optical axis and is disposed on-axis with respect to a corresponding beam-splitting element. The plurality of imaging systems are substantially identical and the plurality of images are preferably substantially identical. The system optionally further comprises at least one neutral density filter, wavelength filter, and/or polarizing filter disposed at an afocal or collimated space. Each distance between a beam-splitting element and a corresponding detector is optionally different.

The present invention is also a method for producing multiple diffraction limited images, the method comprising the steps of splitting the optical beam into a plurality of images with the plurality of beam-splitting elements, the beam-splitting elements comprising actual cross sections each having substantially the same size, shape, and orientation; and imaging the images using a plurality of imaging systems. The splitting step comprise splitting the beam substantially at an aperture stop or pupil of an entire optical system. Each beam splitting element preferably comprises a reflective element comprising a mirror or a facet of a reflective prism. The splitting step optionally comprises partially masking at least one beam splitting element. Each imaging system optionally comprises an off-axis curved mirror. The plurality of images are preferably substantially identical. The method optionally further comprises the step of filtering at least one of the plurality of images through a neutral density filter, a wavelength filter, and/or a polarizing filter. Distances between the beam-splitting elements and corresponding image planes are optionally different.

The present invention is also a diffraction limited system for producing multiple images, the system comprising a plurality of beam splitting elements comprising actual cross sections each having substantially the same size, shape, and orientation; a plurality of imaging systems; and a plurality of detectors for imaging a plurality of images. The beam splitting elements are preferably disposed substantially at an aperture stop or pupil of the system. Each of the beam splitting elements is preferably reflective and comprises a mirror or a facet of a prism. The system optionally further comprises at least one mask for masking the beam splitting elements. Each imaging system preferably comprises an off-axis curved mirror. The plurality of images are preferably substantially identical. The system optionally further comprises at least one neutral density filter, wavelength filter, and/or polarizing filter disposed at an afocal or collimated space. Each distance between a beam-splitting element and a corresponding detector is optionally different.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE INVENTION

Figure 1:
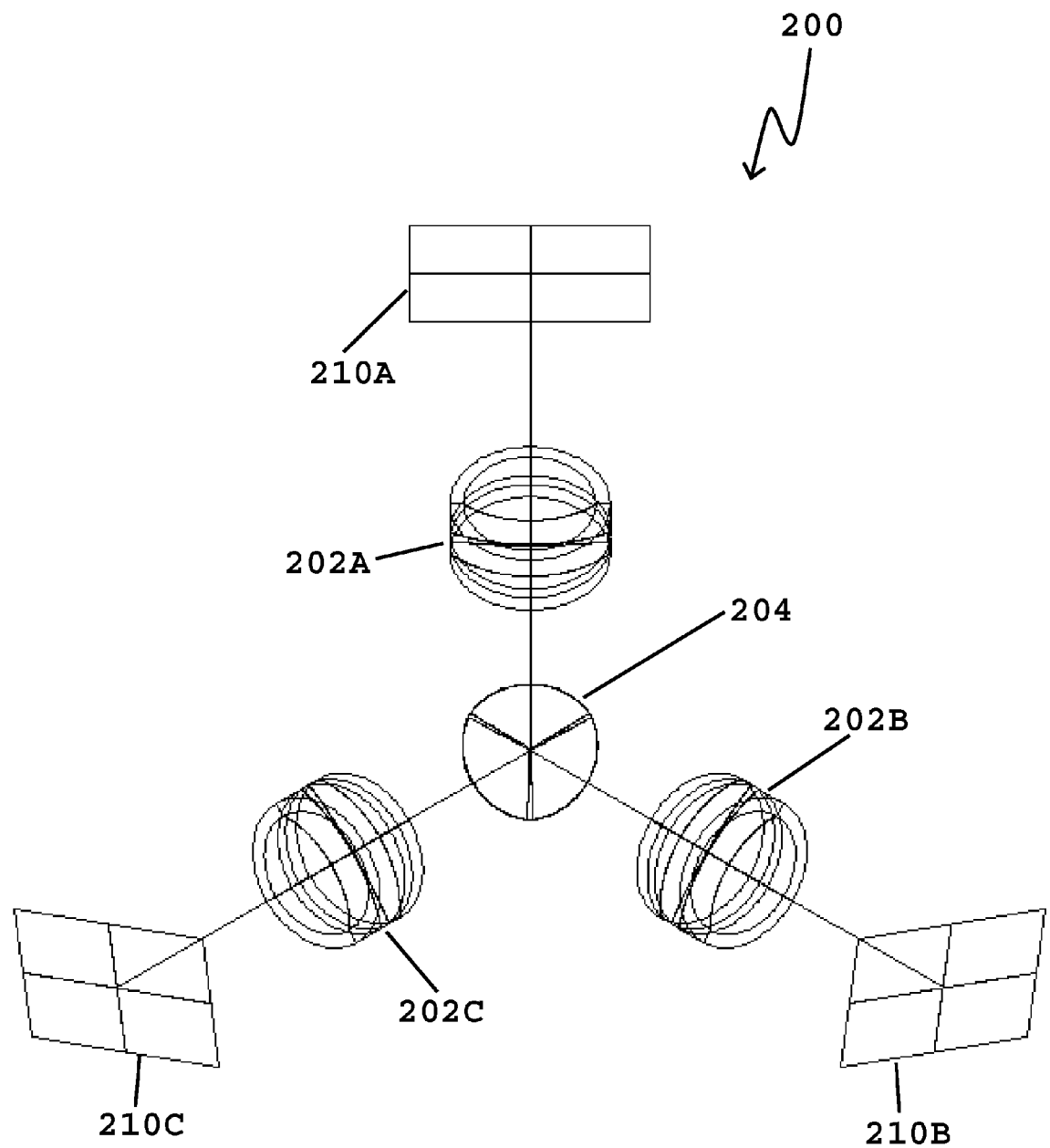
FIG. 1 is an end view of a non-diffraction limited prior art system.

One embodiment of the present invention uses a series of optical elements (an optical system) to produce multiple simultaneous images on multiple separate detector planes. Each individual detector plane is optionally provided with its own individual optical imaging lens. All of the multiple optical imaging lenses, which are preferably substantially identical to one another, are preferably arranged in such a way that their entrance pupils coincide at one, single optical plane which is preferably coincident with the system's aperture stop, or pupil. A reflective beam-splitting element is preferably placed at a location substantially coincident with this pupil. The shape of the reflective beam-splitting element optionally comprises multiple circular cross-sectional areas, one such circular area for each individual arm of the apparatus, to the incoming beam. The shaping of the incoming beam, into multiple circular cross-sectional areas, may be realized through multiple means, including but not limited to the use of individual, tilted, elliptical mirrors, or through the use of a mask imposed on or substantially near the pyramid-shaped beam-splitting element. Shaping of the incoming beam, into multiple circular cross-sectional areas, ensures that the geometrical, diffractive, and out-of-focus imaging properties of the multiple optical imaging lenses are substantially identical. The cross-sectional areas may alternatively be rotationally symmetric as described below.

An embodiment of the present invention utilizes a reflective beam-splitting apparatus to equally split a single entrance pupil for use by multiple, substantially identical optical imaging systems, each of which has its own separate detector plane. Each of these identical optical imaging systems furthermore is preferably configured so that its own individual aperture stop is substantially co-located with the reflective beam-splitting apparatus. Each of the imaging systems preferably forms substantially identical sub-images (typically for distant objects located at a distance from the sub-apertures that is greater than the sub-aperture separation distance). Each of the imaging systems may optionally be supplied with a different filter in order to discriminate one from another of the otherwise substantially identical sub-images.

As used herein "a" means one or more unless otherwise indicated. As used throughout the specification and claims, "having at least the symmetry" of a number means having the rotational symmetry of the number or of any multiple of the number, or being circularly symmetric. For example, an object "having at least the symmetry" of three means having 3-fold rotational symmetry, 6-fold rotational symmetry, etc., or being circularly symmetric. As used throughout the specification and claims, "actual cross section" means the cross section of each of the plurality of individual reflective elements, or sub-apertures, with respect to the axis of the incoming optical beam. The actual cross section is due to the orientation and shape of each of the individual reflective elements or sub-apertures, which may for example be tilted at a specific angle with respect to the incoming beam, optionally in conjunction with one or more masks.

Embodiments of the system of this invention are described herein below. Although the embodiments are described with specificity, and are shown having specific component parameters, it should be noted that the system of this invention is not limited to those parameter ranges. In the embodiments described herein below, although the characteristics of the elements are stated with specificity, it should be noted that the specific value of any of the characteristics of any element of the embodiment is provided to within engineering tolerances. Engineering tolerances as utilized herein include the tolerances within which elements can be procured and the tolerances within which the design performs the desired function.

Non-Diffraction Limited Systems

Prior systems for producing simultaneous multiple images typically employ aperture-splitting elements with shapes that are non-rotationally-identical for spatially splitting an incoming optical beam. For example, FIG. 1 shows an end view of a prior art poorly-performing optical system 200. Aperture-splitting element 204 follows the teachings of many prior art inventions: it is pyramidal in shape, with flat reflective faces, and it serves to split the aperture using wedge-shaped or pie-shaped sub-apertures or individual reflective elements. Each such sub-aperture or individual reflective element has no rotational symmetry. Furthermore, following the teachings of the prior art, each of the three individual imaging subsystems 202A, 202B, and 202C has an optical axis that intersects the tip of the pyramidal reflective aperture-splitting element 204. The resulting poorly-performing optical system 200 appears at first to be rotationally symmetric. However, the three individual imaging subsystems 202A, 202B, and 202C all form simultaneous images of the same object scene on three detector planes 210A, 210B, and 210C. Therefore, the three detector planes 210A, 210B, and 210C must all be oriented (as shown in FIG. 1) so that upright images are produced on each one. Thus, the orientations of the individual facets of the pyramidal reflective aperture-splitting element 204, relative to the orientations of the three detector planes 210A, 210B, and 210C are not identical at all; they are very different.

Figure 2A:
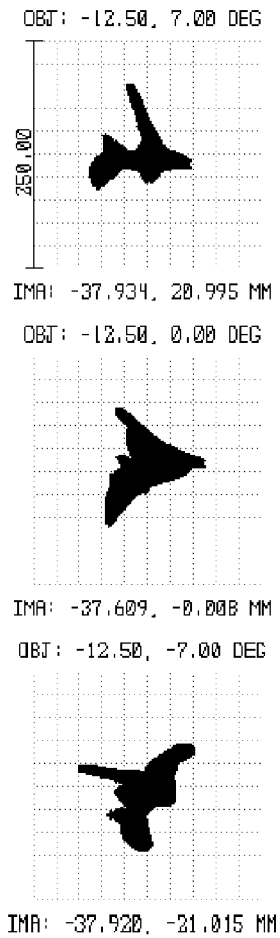
FIGS. 2a-2c are simulated graphical depictions of geometric aberration spot diagrams respectively formed by three individual imaging sub-systems of the prior art system shown in FIG. 1.
Figure 2A:
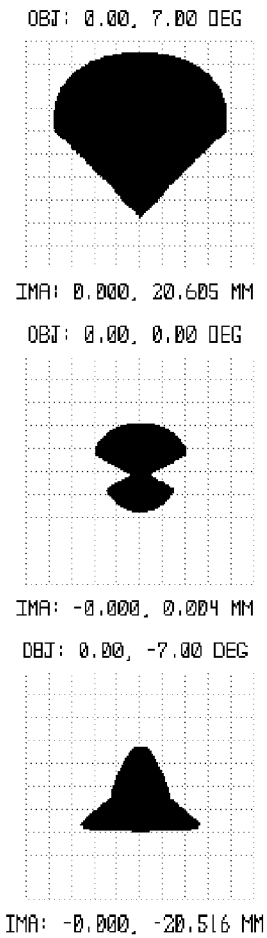
Figure 2A:
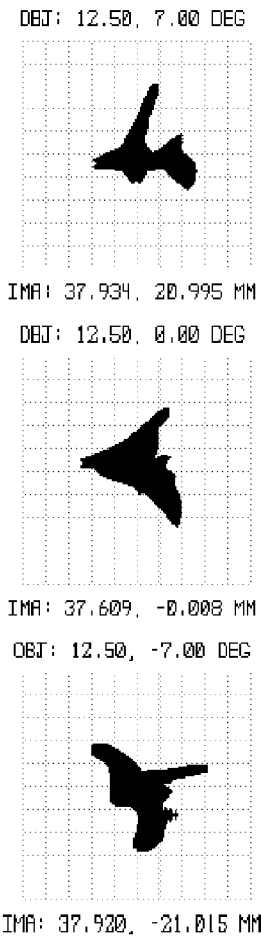

The result is that the three individual imaging subsystems 202A, 202B, and 202C in this case do not form spatially-identical images down to the pixel or sub-pixel level, and therefore are not suitable for high-performance imaging applications. FIG. 2*a* shows a simulated graphical depiction of geometric aberration spot diagrams formed by individual imaging sub-system 202A of prior art optical system 200 of FIG. 1. The top-left spot diagram in FIG. 2*a* shows the geometric aberration spot diagram formed on detector plane 210A by rays that are incident upon prior art system 200 at an angle of −12.5 degrees in the horizontal direction and +7 degrees in the vertical direction. The top-center spot diagram in FIG. 2*a* shows the geometric aberration spot diagram formed on detector plane 210A by rays that are incident upon prior art system 200 at an angle of 0 degrees in the horizontal direction and +7 degrees in the vertical direction. The top-right spot diagram in FIG. 2*a* shows the geometric aberration spot diagram formed on detector plane 210A by rays that are incident upon the prior art system 200 at an angle of +12.5 degrees in the horizontal direction and +7 degrees in the vertical direction.

The middle-left spot diagram in FIG. 2*a* shows the geometric aberration spot diagram formed on detector plane 210A by rays that are incident upon prior art system 200 at an angle of −12.5 degrees in the horizontal direction and 0 degrees in the vertical direction. The middle-center spot diagram in FIG. 2*a* shows the geometric aberration spot diagram formed on detector plane 210A by rays that are incident upon prior art system 200 at an angle of 0 degrees in the horizontal direction and 0 degrees in the vertical direction. The middle-right spot diagram in FIG. 2*a* shows the geometric aberration spot diagram formed on detector plane 210A by rays that are incident upon prior art system 200 at an angle of +12.5 degrees in the horizontal direction and 0 degrees in the vertical direction.

The bottom-left spot diagram in FIG. 2a shows the geometric aberration spot diagram formed on detector plane 210A by rays that are incident upon prior art system 200 at an angle of −12.5 degrees in the horizontal direction and −7 degrees in the vertical direction. The bottom-center spot diagram in FIG. 2a shows the geometric aberration spot diagram formed on detector plane 210A by rays that are incident upon prior art system 200 at an angle of 0 degrees in the horizontal direction and −7 degrees in the vertical direction. The bottom-right spot diagram in FIG. 2a shows the geometric aberration spot diagram formed on detector plane 210A by rays that are incident upon prior art system 200 at an angle of +12.5 degrees in the horizontal direction and −7 degrees in the vertical direction.

Figure 2B:
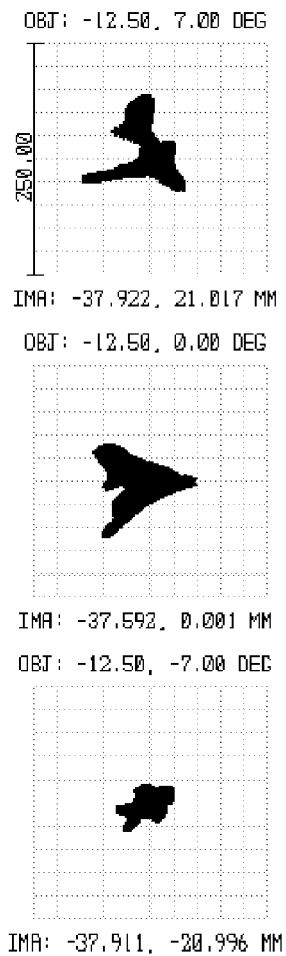
Figure 2B:
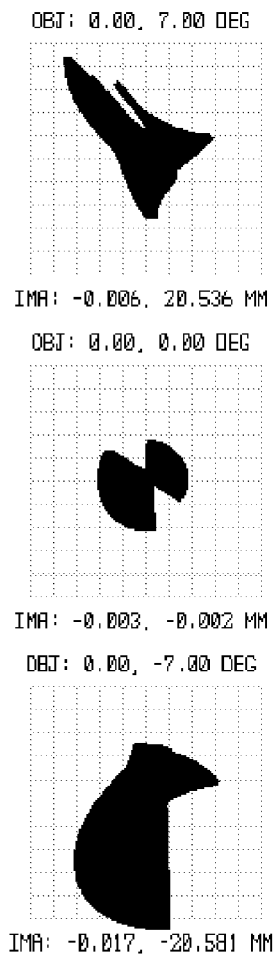
Figure 2B:
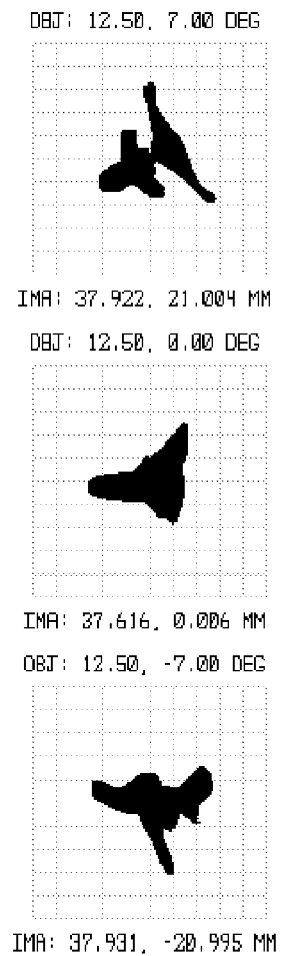
Figure 2C:
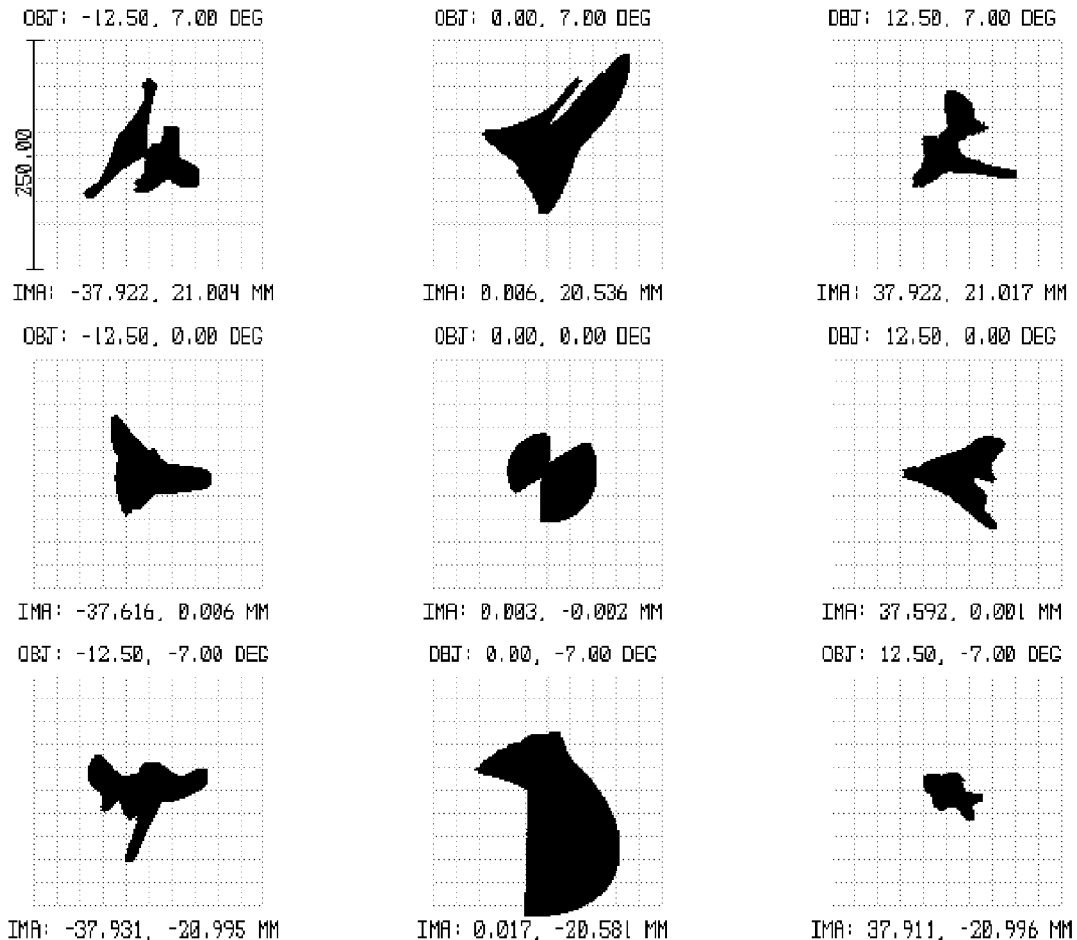

Similarly, FIG. 2b shows a graphical depiction of geometric aberration spot diagrams formed by individual imaging sub-system 202B of prior art system 200, and FIG. 2c shows a graphical depiction of geometric aberration spot diagrams formed by individual imaging sub-system 202C of the poorly-performing prior art optical system 200. The layouts are identical to those shown in FIG. 2a. The fact that the spot diagram for each particular field point, for example the top-center field point, is substantially different for one imaging subsystem 202A (as shown in FIG. 2a) and the other imaging subsystems 202B (as shown in FIG. 2b) and 202C (as shown in FIG. 2c) graphically demonstrates the shortcomings of the prior art in the field of multiple-imaging systems. Because prior art optical system 200 comprises a beam-splitting apparatus 204 comprising wedge-shaped individual sub-apertures, it produces differently-shaped, differently-sized, and/or differently-oriented blur spots for out-of-focus points in each of the images formed on the three detector planes 210A, 210B, and 210C.

Figure 3:
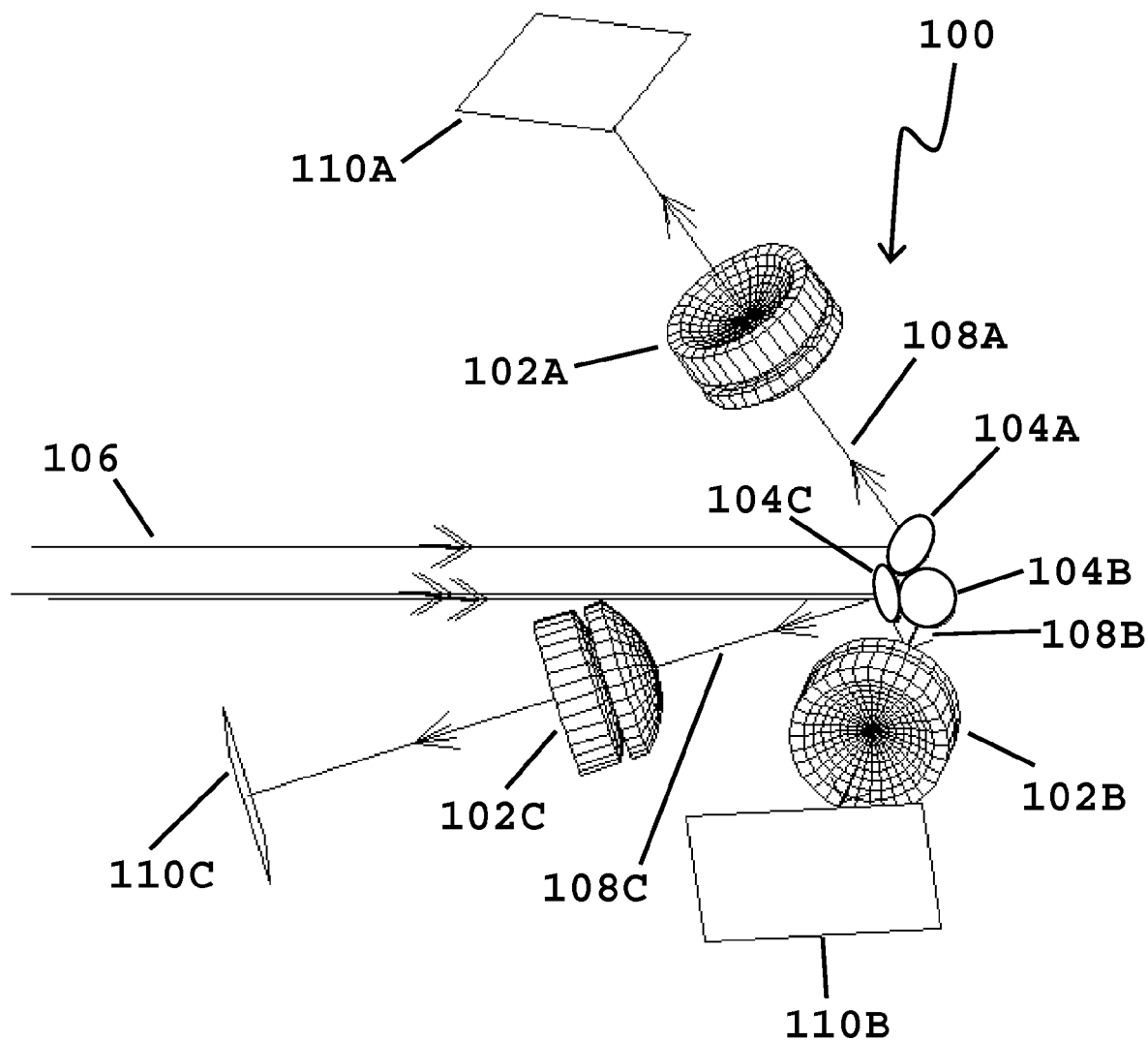
FIGS. 3-5 show perspective, side, and end views respectively of a non-diffraction limited embodiment of the present invention.
Figure 4:
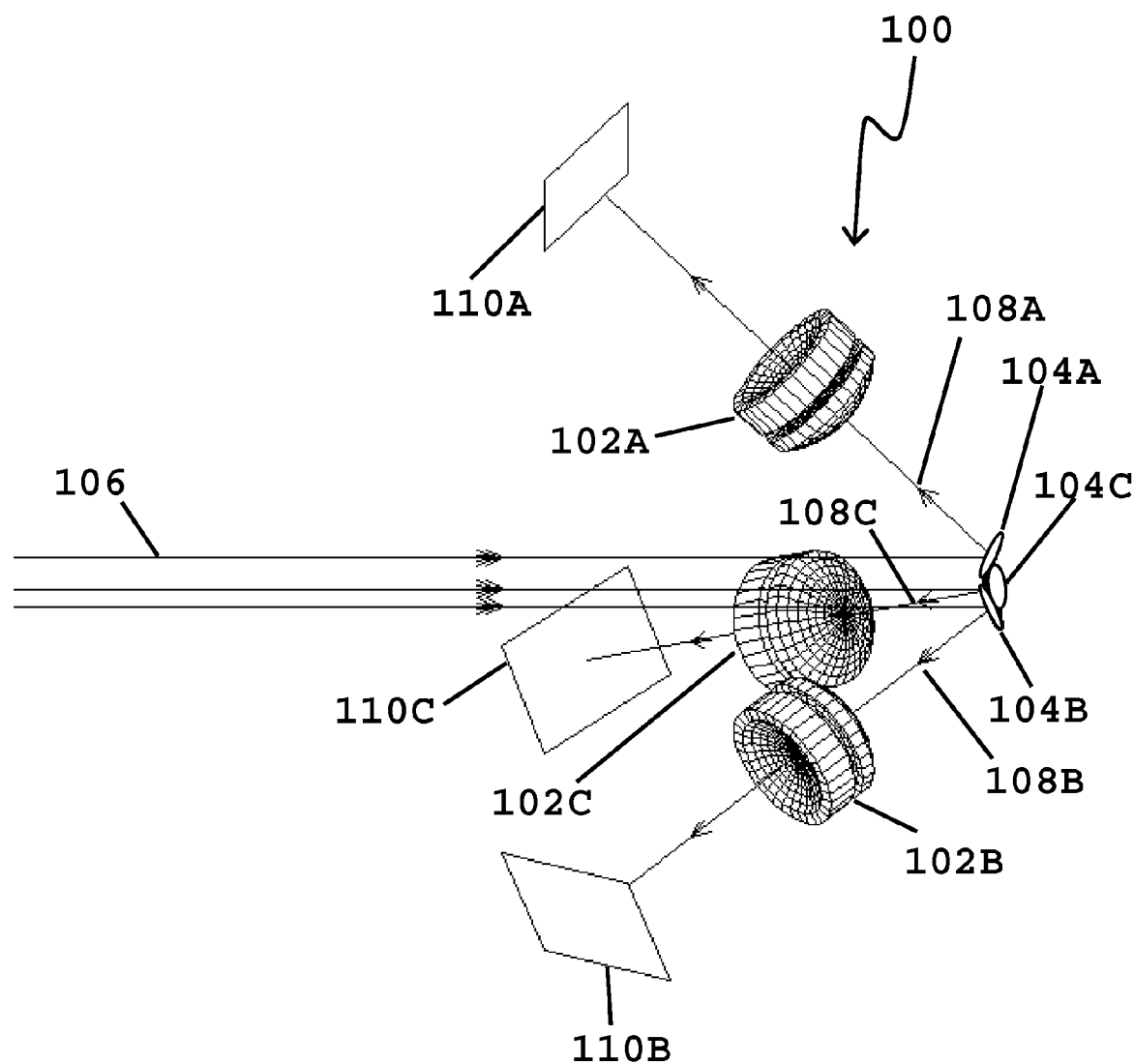
Figure 5:
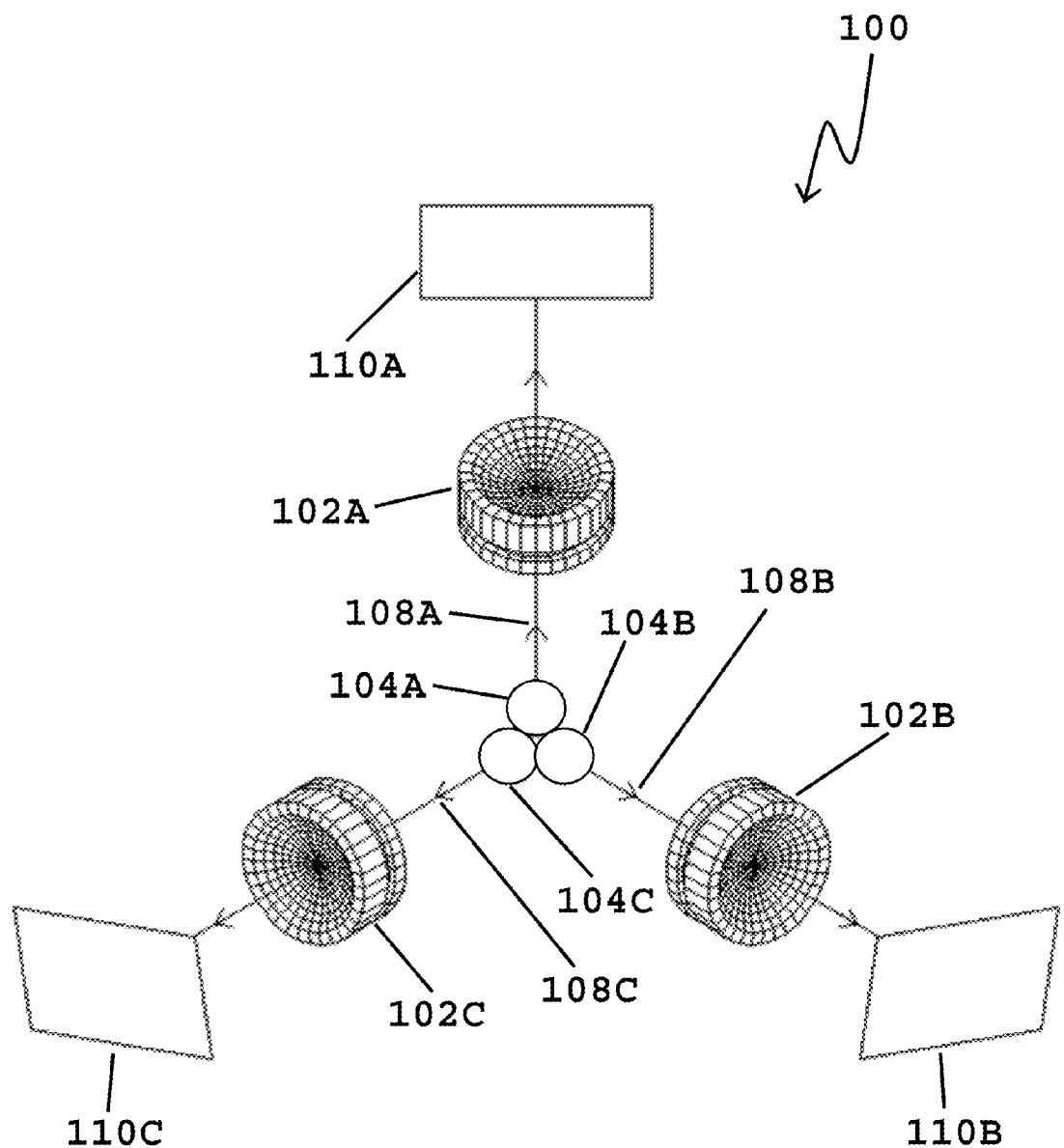

FIGS. 3, 4, and 5 respectively depict a perspective view, a side view, and an end view, respectively of an embodiment of the present invention 100. The components of this first preferred embodiment 100 include three substantially identical imaging lens systems 102A, 102B, and 102C, positioned such that the entrance pupils for these three lenses substantially coincide with the centers of three elliptical-shaped mirrors 104A, 104B, and 104C, respectively. Mirrors 104A, 104B, and 104C are preferably small and flat. Optical radiation 106 from a distant object reflects from the three flat mirrors 104A, 104B, and 104C (and is thus spatially split) into three different directions 108A, 108B, and 108C and is thereafter caused by the three lenses 102A, 102B, and 102C to form three substantially identical images on three detector planes 110A, 110B, and 110C, respectively. Although the shape of each of mirrors 104A, 104B, and 104C may be elliptical (or another shape), the actual cross-section of each mirror 104A, 104B, and 104C as seen by the incoming optical radiation 106, and as shown in the perspective of FIG. 5 (along the axis of the incoming optical radiation 106), is preferably circular. Although in this embodiment, and in other embodiments described herein, the incoming beam is split three ways, the incoming beam may be split and reflected to any number of detector planes.

Mirrors 104A, 104B, and 104C are preferably placed at a location that is an aperture stop, or equivalently an image of the aperture stop (a pupil), of the entire imaging system. Each mirror, or individual reflective element, may also be referred to as a sub-aperture. Thus this embodiment exhibits no vignetting (field-dependent obscuration of a portion of the light reaching the detector). A pupil relay system, which would contain an aperture stop of its own and which would relay an image of that aperture stop to a plane substantially coincident with the location of mirrors 104A, 104B, and 104C, or any other fore-optic system that provides an aperture stop at a location substantially coincident with the mirrors 104A, 104B, and 104C, may optionally be added to this embodiment 100 of the invention without significantly affecting its operation. Such an additional fore-optic or pupil relay system could be used to increase the overall system field-of-view, for example.

By splitting the entrance pupil of this system into circular sub-apertures, and further requiring that individual imaging sub-systems 102A, 102B, and 102C each has its entrance pupil co-located with the reflective splitting element, substantially spatially-identical images are caused to form on detector planes 110A, 110B, and 110C, even when imaging sub-systems 102A, 102B, and 102C exhibit geometric imaging aberrations, provided that each imaging sub-system 102A, 102B, and 102C is rotationally symmetric about its optical axis, and this optical axis is aligned with the center of each mirror as described above. For example, imaging system 102A is preferably rotationally symmetric about its optical axis 123, as shown in FIG. 6.

Figure 6:
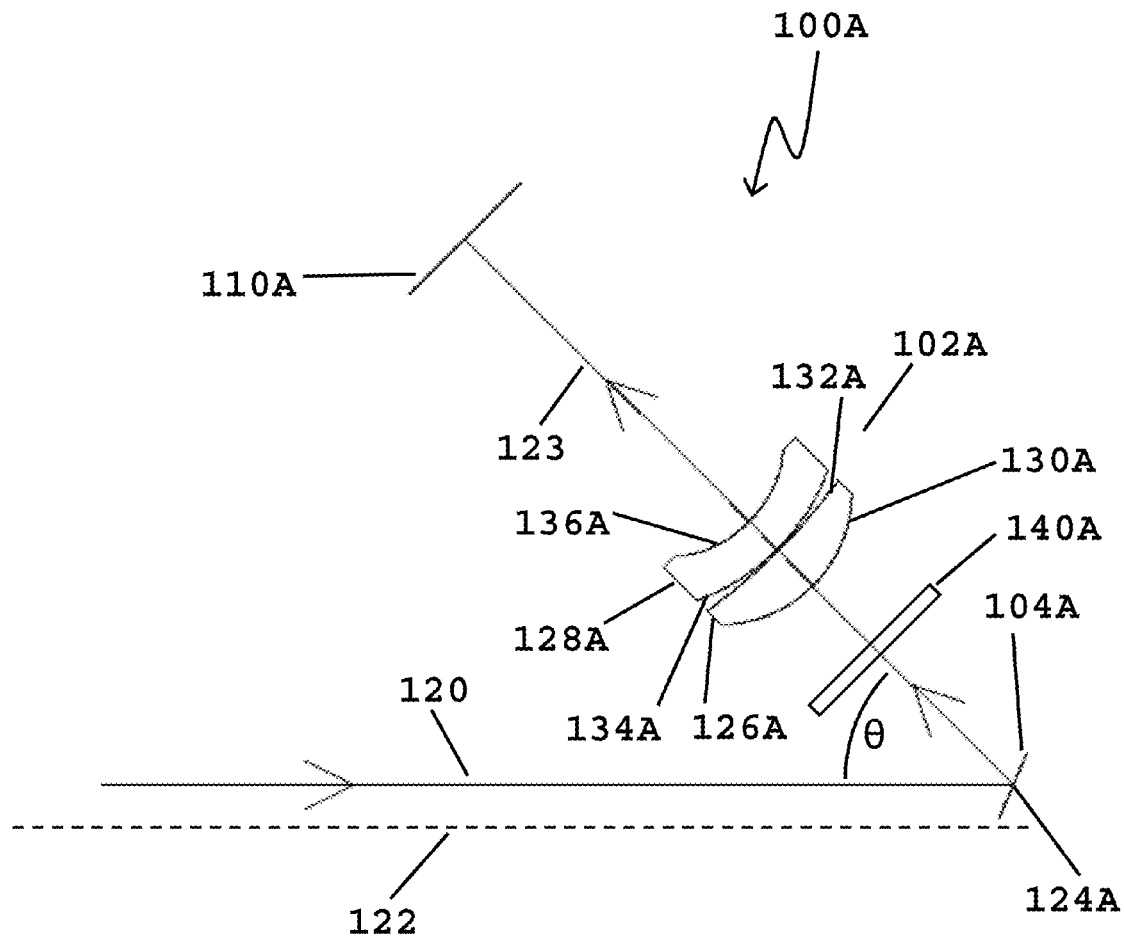
FIG. 6 is a side view of a single arm of the embodiment of the invention shown in FIGS. 3-5.

FIG. 6 shows a side view of single arm 100A of embodiment of the invention 100. In this embodiment there are three such single arms, each identical in form and function to single arm 100A and each separated from another single arm by a rotation of 120 degrees around an axis of symmetry 122. Axis of symmetry 122 is preferably oriented parallel to the direction of incoming optical radiation 106 and intersects a point equidistant between mirrors 104A, 104B, and 104C. Initial optical axis 120 of this single arm 100A is at first parallel to axis of symmetry 122 and then, after reflection from mirror 104A, optical axis 123 preferably continues at an angle of θ=45 degrees relative to its original orientation.

An example of this embodiment in accordance with FIGS. 3-6 (without optional optical filter 140A) was simulated, wherein center 124A of mirror 104A was displaced upward from axis of symmetry 122 by a distance of 11.547 mm (in a direction perpendicular to axis of symmetry 122), which corresponds to a mirror 104A with a minor-axis diameter of 20.0 mm. The normal to the elliptical mirror face was tilted upward at an angle of 22.5 degrees from initial optical axis 120.

Imaging lens 102A comprised first lens element 126A and second lens element 128A. The shapes of some of the optical surfaces are even aspheres, where the surface sag of each even asphere surface is generally given by the following even asphere sag equation:

$$z = cr^2 / \{1 + [1-(1+k)c^2r^2]^{1/2}\} + \alpha_4 r^4 + \alpha_6 r^6 + \alpha_8 r^8$$

where c is the curvature (the reciprocal of the radius of curvature, which has units of mm), r is the radial coordinate in mm, k is the conic constant, and $\alpha_4$, $\alpha_6$, and $\alpha_8$ are the coefficients on the fourth, sixth, and eighth power polynomial terms, respectively. Note that for surfaces whose shapes are spheres, the same equation holds and $k = \alpha_4 = \alpha_6 = \alpha_8 = 0$.

In this example, first lens element 126A comprised glass with an optical index of refraction ($n_d$) of 1.5168 and an Abbe dispersion number ($V_d$) of 64.1673, such as Schott glass N-BK7. The shape of first surface 130A of first lens element 126A comprised a convex even asphere with a radius of curvature of 41.4 mm, a conic constant of −0.984, $\alpha_4 = 2.75\text{e-}6$ mm$^{-3}$, $\alpha_6 = -5.17\text{e-}10$ mm$^{-5}$, and $\alpha_8 = 8.08\text{e-}13$ mm$^{-3}$. The shape of the second surface 132A of the first lens element 126A comprised a concave sphere with a radius of curvature of 172.5 mm. The first lens element 126A measured 56 mm in diameter. Second lens element 128A comprised glass with an optical index of refraction ($n_d$) of 1.805182 and an Abbe dispersion number ($V_d$) of 25.3939, such as Schott glass SFL6. The shape of the first surface 134A of the second lens element 128A comprised a convex sphere having a radius of curvature of 66.4 mm. The shape of the second surface 136A of the second lens element 128A comprised a concave even asphere with a radius of curvature of 41.1 mm, a conic constant of 1.076, $\alpha_4$=1.75e-6 mm$^{-3}$, $\alpha_6$=−1.92e-9 mm$^{-5}$, and $\alpha_8$=1.33e-12 mm$^{-3}$. The second lens element 128A measured 56 mm in diameter. The center distance, measured along the optical axis 123, between center 124A of elliptical mirror 104A and center of the first surface 130A of first lens element 126A was 85.856 mm. The center thickness, measured along the optical axis 123, of first lens element 126A was 15.000 mm. The center distance, measured along the optical axis 123, of the airgap between first lens element 126A and second lens element 128A was 0.500 mm. The center thickness, measured along the optical axis 123, of second lens element 128A was 12.000 mm. The center distance, measured along the optical axis 123, of the airgap between second lens element 128A and detector plane 110A was 122.000 mm. In this example detector plane 110A comprised a 35 mm CMOS sensor, although any optical sensor may be employed.

Figure 7A:
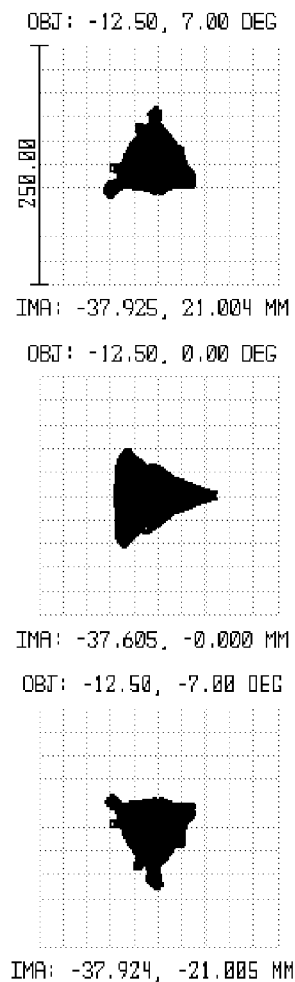
FIGS. 7a-7c are simulated graphical depictions of geometric aberration spot diagrams respectively formed by the three individual imaging sub-systems of an example of the embodiment of the invention shown in FIGS. 3-6.
Figure 7A:
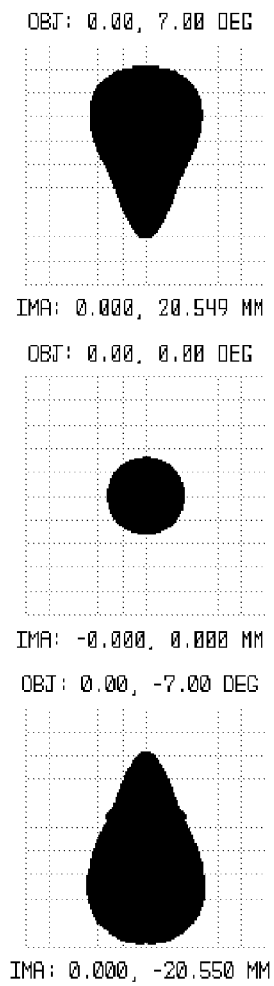
Figure 7A:
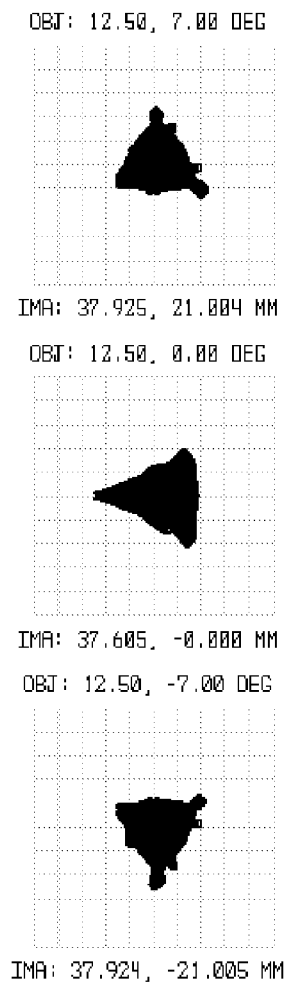

FIG. 7a shows a graphical depiction of a computer simulation of geometric aberration spot diagrams formed by individual imaging sub-system 102A of the above example of embodiment of the invention 100. The top-left spot diagram in FIG. 7a shows the geometric aberration spot diagram formed on detector plane 110A by rays that are incident upon system embodiment 100 at an angle of −12.5 degrees in the horizontal direction and +7 degrees in the vertical direction. The top-center spot diagram in FIG. 7a shows the geometric aberration spot diagram formed on detector plane 110A by rays that are incident upon system embodiment 100 at an angle of 0 degrees in the horizontal direction and +7 degrees in the vertical direction. The top-right spot diagram in FIG. 7a shows the geometric aberration spot diagram formed on detector plane 110A by rays that are incident upon system embodiment 100 at an angle of +12.5 degrees in the horizontal direction and +7 degrees in the vertical direction.

The middle-left spot diagram in FIG. 7a shows the geometric aberration spot diagram formed on detector plane 110A by rays that are incident upon system embodiment 100 at an angle of −12.5 degrees in the horizontal direction and 0 degrees in the vertical direction. The middle-center spot diagram in FIG. 7a shows the geometric aberration spot diagram formed on detector plane 110A by rays that are incident upon system embodiment 100 at an angle of 0 degrees in the horizontal direction and 0 degrees in the vertical direction. The middle-right spot diagram in FIG. 7a shows the geometric aberration spot diagram formed on detector plane 110A by rays that are incident upon system embodiment 100 at an angle of +12.5 degrees in the horizontal direction and 0 degrees in the vertical direction.

The bottom-left spot diagram in FIG. 7a shows the geometric aberration spot diagram formed on detector plane 110A by rays that are incident upon system embodiment 100 at an angle of −12.5 degrees in the horizontal direction and −7 degrees in the vertical direction. The bottom-center spot diagram in FIG. 7a shows the geometric aberration spot diagram formed on detector plane 110A by rays that are incident upon system embodiment 100 at an angle of 0 degrees in the horizontal direction and −7 degrees in the vertical direction. The bottom-right spot diagram in FIG. 7a shows the geometric aberration spot diagram formed on detector plane 110A by rays that are incident upon system embodiment 100 at an angle of +12.5 degrees in the horizontal direction and −7 degrees in the vertical direction.

Figure 7B:
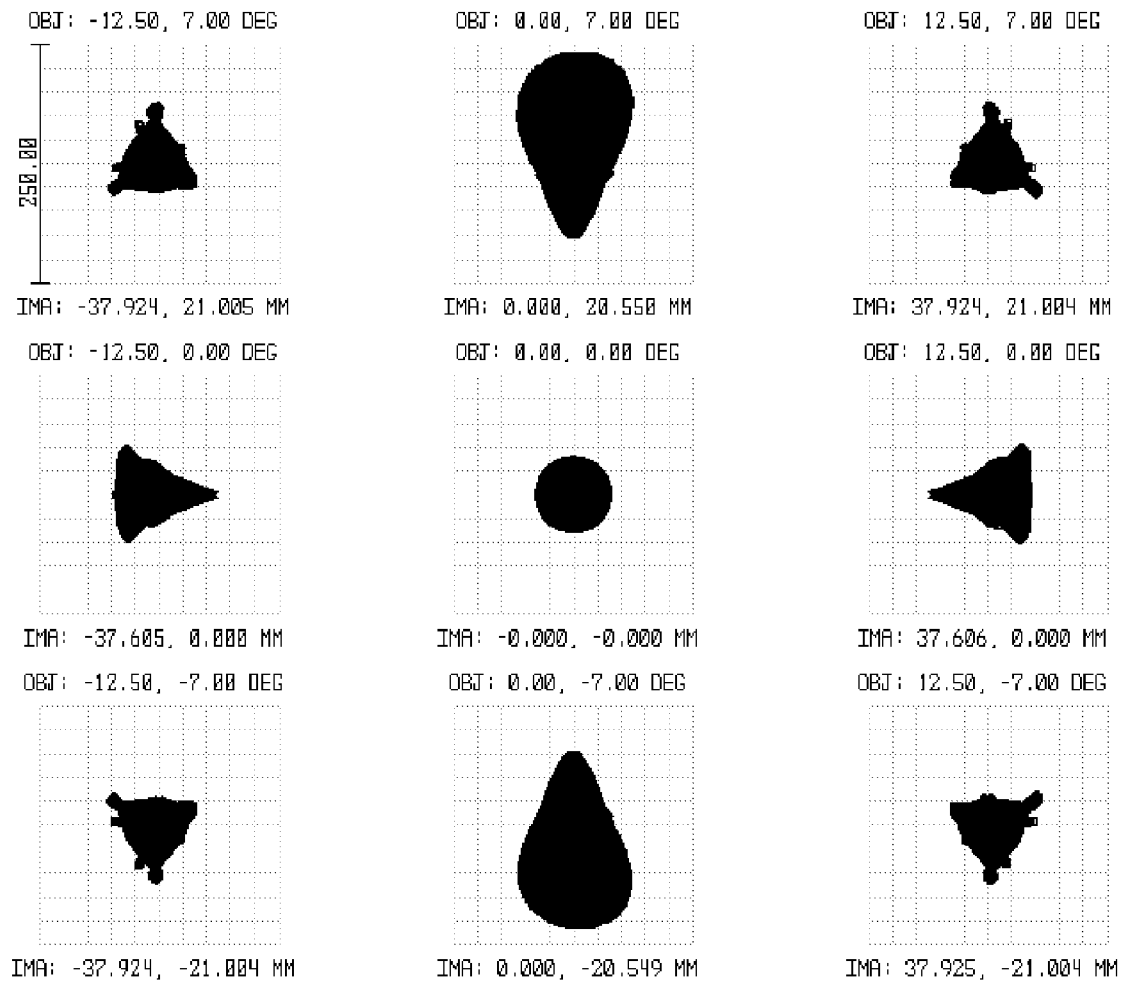
Figure 7C:
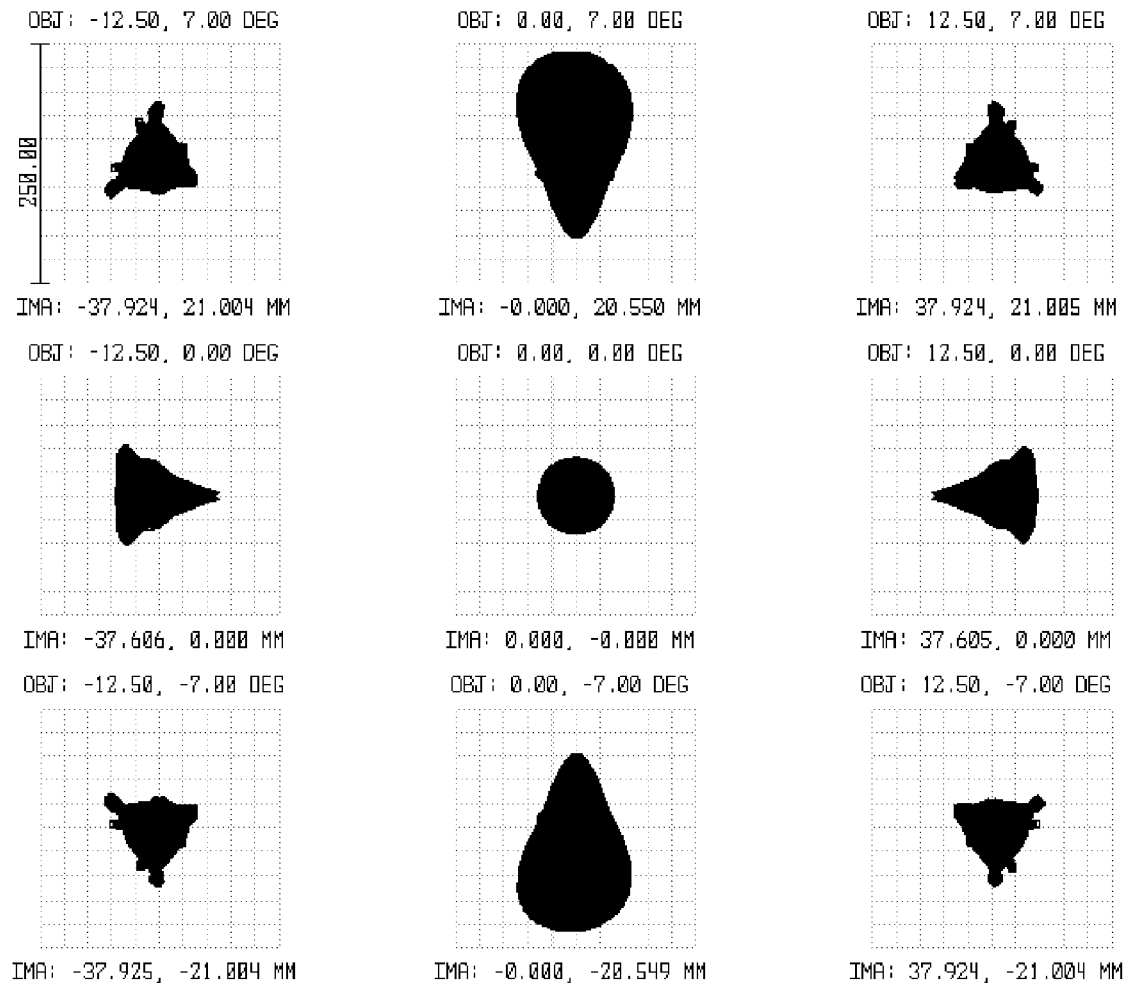

FIG. 7b shows a graphical depiction of a computer simulation of geometric aberration spot diagrams formed by individual imaging sub-system 102B. FIG. 7c shows a graphical depiction of a computer simulation of geometric aberration spot diagrams formed by individual imaging sub-system 102C. The layouts are identical to the layout described for FIG. 7a. The geometric aberration spot diagrams shown in FIGS. 7a-7c are large in size, measuring between 50 and 100 microns in this case, compared to size of the diffraction spot, or so-called "Airy disc" (not visible), which has a diameter of approximately 13 microns in this case. Therefore, the imaging performance is not diffraction-limited, and the geometric aberrations are non-negligible and contribute significantly to the image formed. It is clear from the images in FIGS. 7a-7c that the corresponding geometric aberration spot diagrams created by the three individual imaging sub-systems 102A, 102B, and 102C are practically identical in shape, size, and orientation, unlike the spot diagrams created by prior art system 200. Therefore the images formed on the three detector planes 110A, 110B, and 110C are substantially identical, preferably down to the sub-pixel level.

A circular shape is merely one convenient shape for the cross-sectional areas of mirrors 104A, 104B, and 104C. For an embodiment of a non-diffraction limited version of the invention with n multiple image planes, the aperture stop must have a shape that is (i*n) ways rotationally symmetric, where i is any integer number (including infinity, which results in a perfectly circular shape). For example, embodiment 100 of the invention forms identical images on n=3 separate image planes. Therefore, in order to satisfy the conditions of the present invention, the sub-apertures may be 3-sided regular polygons (equilateral triangles), 6-sided regular polygons (hexagons), 9-sided regular polygons (nonagons), 12-sided regular polygons (dodecagons), et cetera, or the sub-apertures may be circular. For the embodiment shown in FIGS. 3-6, a circular actual cross-sectional shape was chosen for mirrors 104A, 104B, and 104C, but any regular polygon with a number of sides that is an integral factor of 3 may be used to achieve the same effects described in this embodiment. Unlike circular sub-apertures which are always automatically identically-oriented, care must be taken when designing a system using polygon-shaped sub-apertures to ensure that all three sub-apertures are oriented substantially identically when viewed from a direction substantially along the direction followed by the incoming optical radiation 106.

Figure 8A:
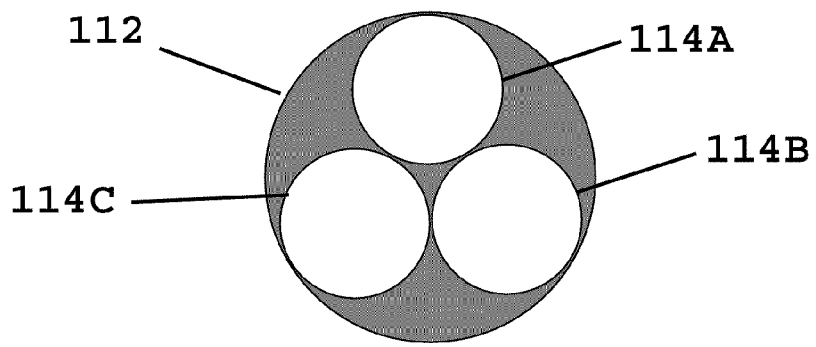
FIG. 8a is an end view of a circular aperture mask.
Figure 8B:
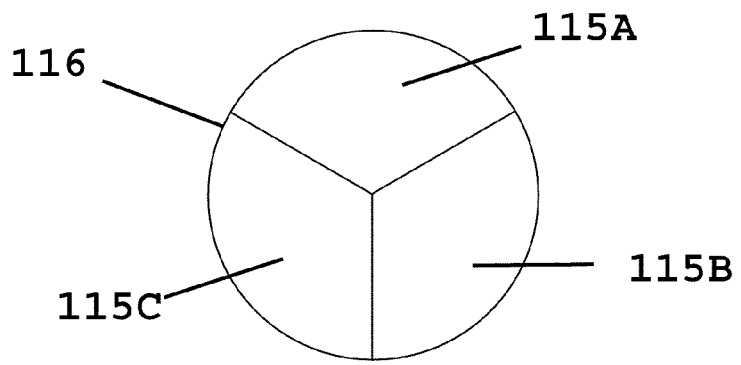
FIG. 8b is an end view of a pyramid-shaped reflecting element.
Figure 8C:
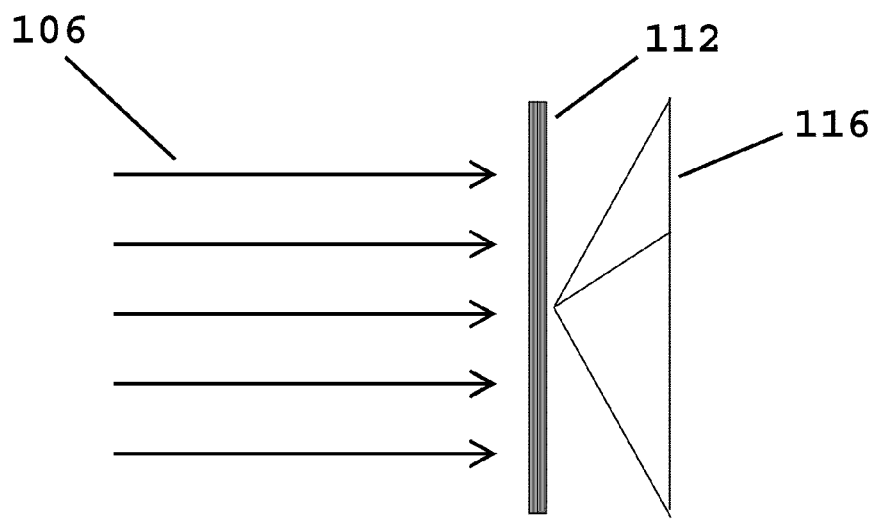
FIG. 8c is a side view of the mask of FIG. 8a and pyramid-shaped reflecting element of FIG. 8b arranged in accordance with embodiments of the present invention.

An equivalent method for providing sub-apertures having circular actual cross-sections is depicted in FIGS. 8a-8c. Mask 112 and pyramid-shaped aperture-splitting element 116 together act as a replacement for elliptical mirrors 104A, 104B, and 104C. Mask 112 is preferably shaped so that it blocks or absorbs all light except that which passes through the three, substantially equally-sized, circular holes 114A, 114B, 114C. The angles of the flat reflective faces or sub-apertures 115A, 115B, 115C of the pyramid-shaped reflecting element 116 preferably match the angles of mirrors 104A, 104B, and 104C. Although the pie- or wedge-shaped sub-apertures 115A, 115B, 115C are not three-fold symmetric or circular, since each mask opening 114A, 114B, 114C is preferably smaller than each sub-aperture 115A, 115B, 115C, the combination of the mask and the pyramidal aperture-splitting element forms a circular actual cross section.

Figure 9A:
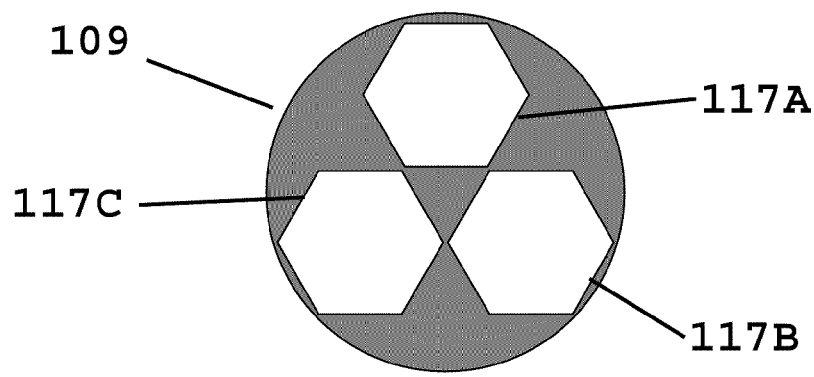
FIGS. 9a-9c are end views of various aperture masks usable with embodiments of the present invention.

FIG. 9a shows an alternative mask 109 comprising three separate openings 117A, 117B, and 117C that are shaped like regular hexagons. Alternative mask 109 may be used instead of mask 112 comprising circular-shaped openings 112A, 112B, and 112C, to arrive at a substantially similar embodiment. The hexagonal shapes of openings 117A, 117B, and 117C in alternative mask 117 are preferably oriented substantially identically when viewed from a direction substantially similar to the direction of incoming optical radiation 106. Note that while FIG. 9a teaches of using a mask 109 with hexagon-shaped holes 117A, 117B, and 117C, a functionally identical method for imposing hexagon-shaped sub-apertures on the system would be to physically shape each of the mirrors 104A, 104B, and 104C so that they appear as regular hexagons (that is, have an actual cross-section of a regular hexagon) when viewed from a direction substantially similar to the direction followed by the incoming optical radiation 106.

Figure 9B:
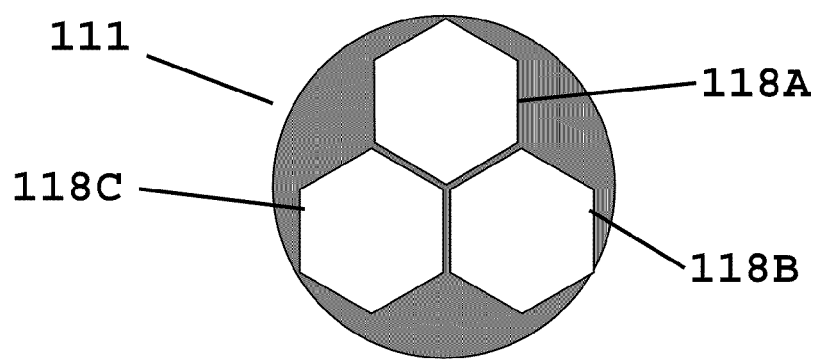

FIG. 9b shows alternative mask 111 comprising three openings 118A, 118B, and 118C that are shaped like regular hexagons. Comparing this mask with alternative mask 109 shown in FIG. 9a, it is clear that the absolute orientation of the hexagon-shaped openings is not important as long as all three hexagon-shaped openings are oriented substantially identically to one another.

Figure 9C:
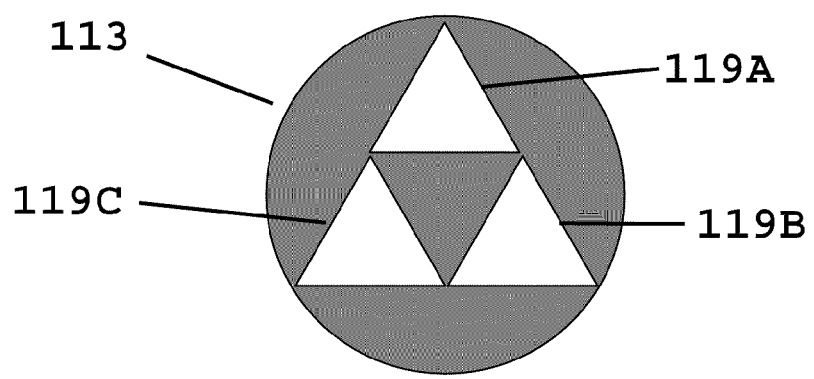

FIG. 9c shows another alternative mask 113 comprising three separate openings 119A, 119B, and 119C that are shaped like equilateral triangles. Alternative mask 113 may be used instead of mask 112 comprising circular-shaped openings 112A, 112B, and 112C, to arrive at a significantly similar embodiment. The equilateral-triangle shapes of openings 119A, 119B, and 119C are preferably oriented substantially identically when viewed from a direction substantially similar to the direction of incoming optical radiation 106.

Any of the masks described herein are preferably quickly and easily replaceable with another mask comprising openings having different shapes or sizes. For example, the circular openings of one mask may be larger or smaller than the circular openings of another mask (However, each opening on the same mask is preferably the same size). The system may alternatively comprise a method for simultaneously changing the sizes of all of the openings on a mask. For example, in the case of circular openings, the mask may comprise mechanical irises to changes the sizes of the openings. In either of these ways, a provision is made for quickly and easily changing the sizes or shapes of the sub-apertures.

Referring to FIG. 6, optical filter 140A may optionally be disposed between mirror 104A and first lens element 126A. The exact location of optical filter 140A is typically not important as long as it is located so that it acts only on the light through single arm 100A which forms an image on detector 110A, and so that it does not act on light that is used to form images on the detectors in the other arms. For example, optical filter 140A may alternatively be placed in a plane that is substantially similar to the location of the elliptical mirror 104A.

There are many ways to take advantage of having multiple, simultaneous images. Each of the separate images may be filtered through a particular optical filter. Each of the images formed on the detector planes is formed using a beam of light that may optionally have passed through an optical filter having particular optical properties, such as filtering wavelengths of transmission or polarization states or optical density. In this way, multiple spatially-identical images are formed, each of which may be individually filtered with wavelength- or polarization- or optical density-specific filters. These filters may be placed at any point along the individual beam paths, although they preferably are placed in a portion of the beam path where the beam is neither converging nor diverging (sometimes called a collimated or an afocal space). If the optional optical filter used in each arm is a wavelength filter, with each arm comprising an optical filter having a different optical transmission prescription than the other arms, then the system will produce images suitable for "multi-spectral" scientific imaging. Because most spectral filters use multi-layer coatings, which are sensitive to changes in incident light angles (they work best when incident angles are close to zero), the present invention can produce excellent results, since the image splitting is done at an aperture plane where the ray angles are smallest relative to the spectral filters.

If alternatively the optional optical filter is a neutral-density filter, with each arm comprising an optical filter having a different optical transmission prescription than the other arms, then the embodiment will produce images suitable for "high dynamic range" imaging (HDRI), thus allowing for the first time high-resolution HDRI with a moving camera and/or moving subjects.

If alternatively the optional optical filter comprises a polarizing filter, with each arm comprising an optical filter that transmits a different polarization state than the other arms, then the embodiment will produce images suitable for "imaging polarimetry."

In an alternative embodiment, the distance between the second lens element and the detector plane may differ for each arm of the embodiment, thus causing each arm, and thus each image, to have a different focal depth but otherwise identical imaging. In this case, no optical filter need be employed, and through the use of image post-processing, this embodiment may be used to produce high-resolution moving images wherein each frame contains multiple depths of focus with a moving camera, something never before realized.

In cinematography and photography it is often desirable to produce an image with a foreground subject that is in focus while the background is out-of-focus. It is also often the case that bright lights can cause "lens flares" on the image. It is well-understood that (i) the shape of an out-of-focus blur spot or of a lens flare produced by an imaging system is substantially the same as the shape of the imaging system's aperture stop; (ii) the size of the blur spot or lens flare is proportional to the size of the imaging system's aperture stop; and (iii) the orientation of the blur spot or lens flare relative to the detector plane is substantially the same as the orientation of the imaging system's aperture stop relative to the detector plane. Therefore, referring to embodiment 100 of this invention (which comprises three elliptical mirrors 104A, 104B, 104C that each provide a circular sub-aperture to each of the three imaging systems 102A, 102B, and 102C respectively, which circular sub-apertures are substantially identical in size), the shape of an out-of-focus blur spot or lens flare produced by each of the three identical imaging systems 102A, 102B, 102C on each of the three detector planes 110A, 110B, 110C respectively is round, and furthermore all three blur spots or lens flares are substantially identical in size.

Note that the sub-apertures need not be circular in order to ensure identical blur spots or lens flares on detector planes 110A, 110B, 110C. As previously mentioned, any regular polygon shape with a number of sides equal to an integral factor of 3 (the number of sub-apertures in this embodiment) may be used to achieve identical blur spots or lens flares on separate detector planes 110A, 110B, 110C.

Diffraction Limited Systems

Figure 10:
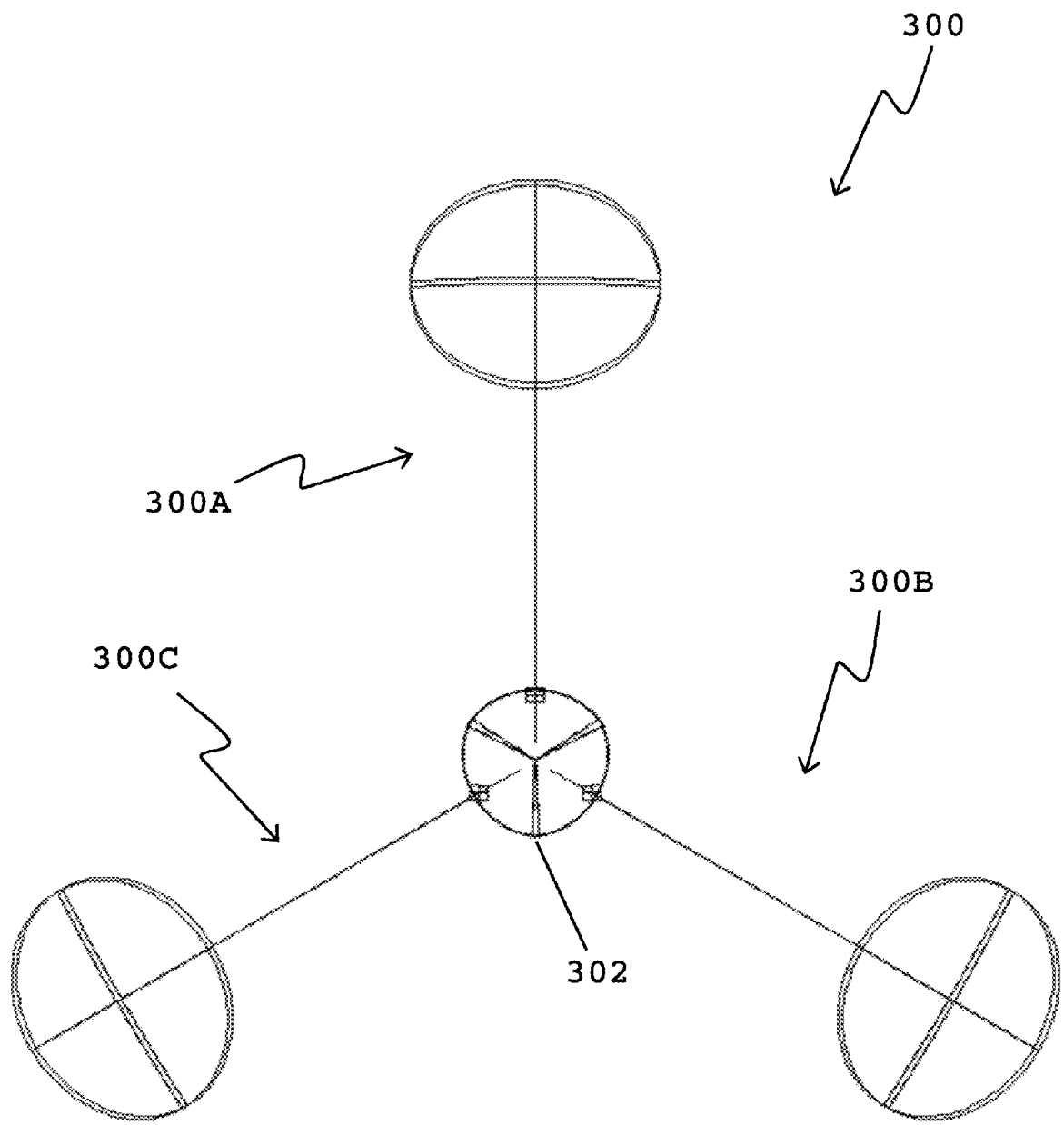
FIG. 10 is an end view of a diffraction limited prior art optical system.

The present invention is also applicable to diffraction limited systems. FIG. 10 shows an end view of prior art diffraction limited optical system 300 comprising aperture-splitting element 302 which is pyramidal in shape and comprises flat reflective faces, and it serves to split the aperture using wedge-shaped sub-apertures. The result is that the three individual imaging subsystems 300A, 300B, and 300C do not form spatially-identical images down to the pixel or sub-pixel level, and therefore are not suitable for high-performance imaging applications.

Figure 11A:
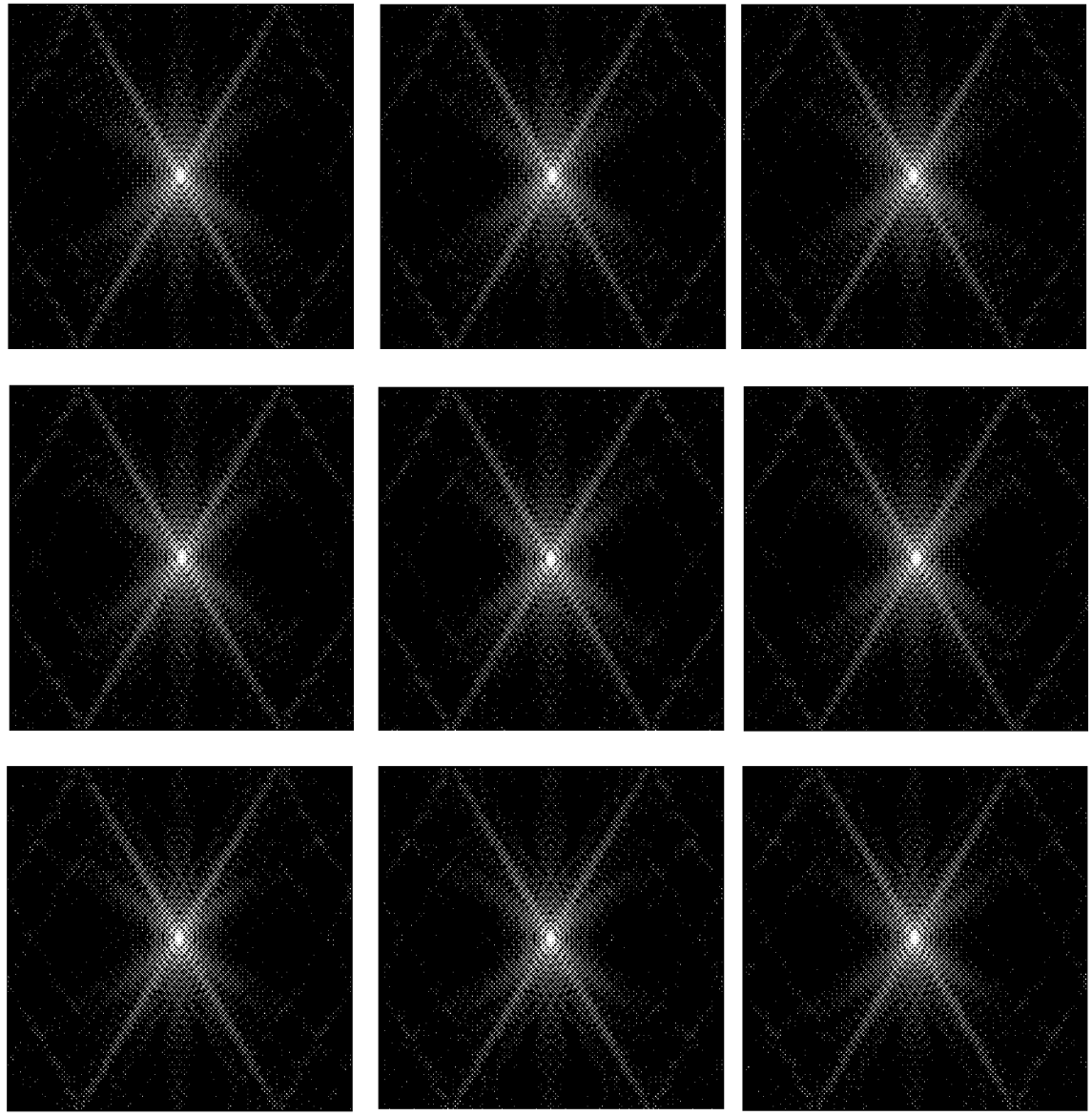
FIGS. 11a-11c are simulated graphical depictions of Point Spread Functions respectively formed by three individual imaging sub-systems of the prior art system shown in FIG. 10.
Figure 11B:
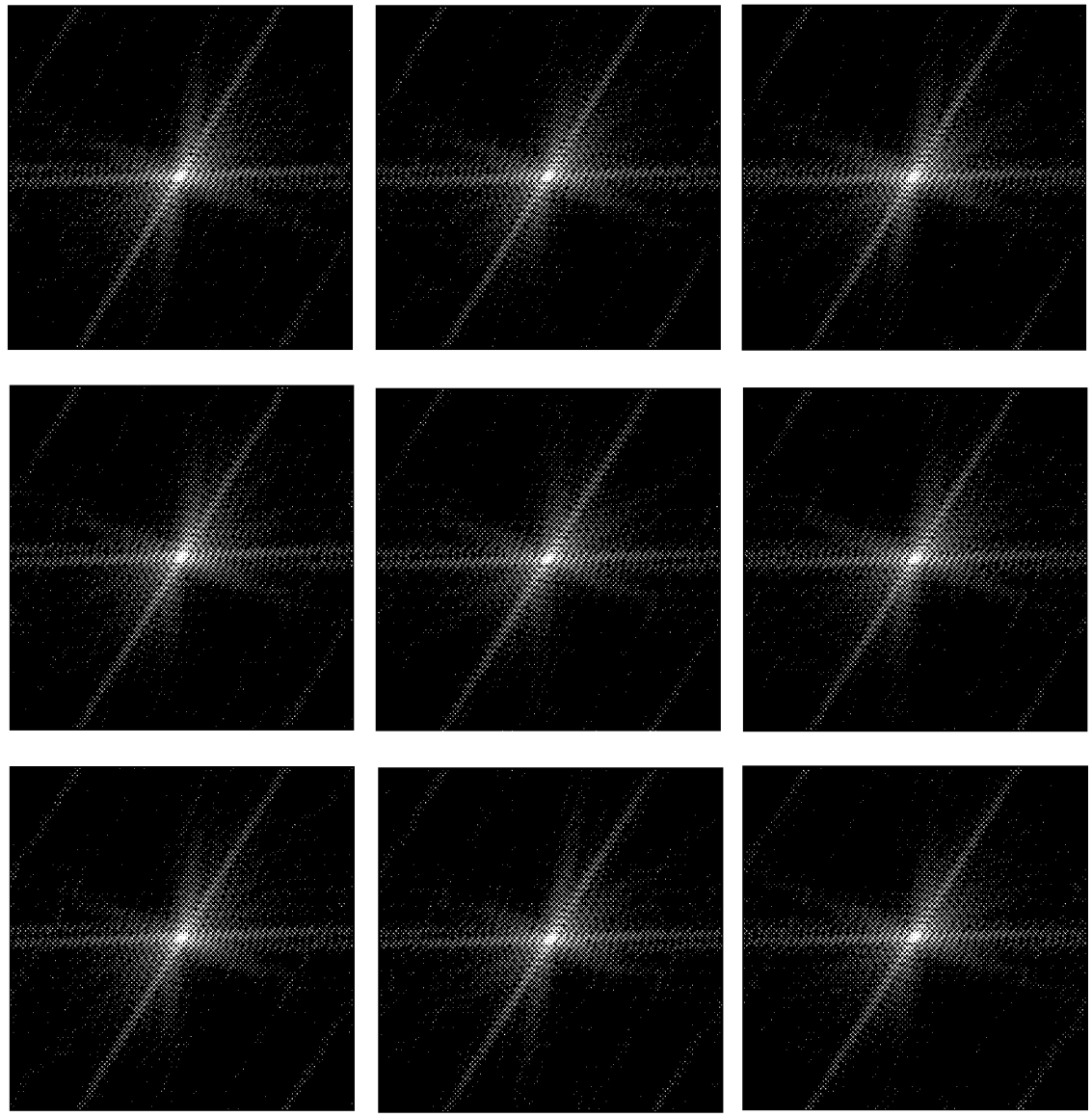
Figure 11C:
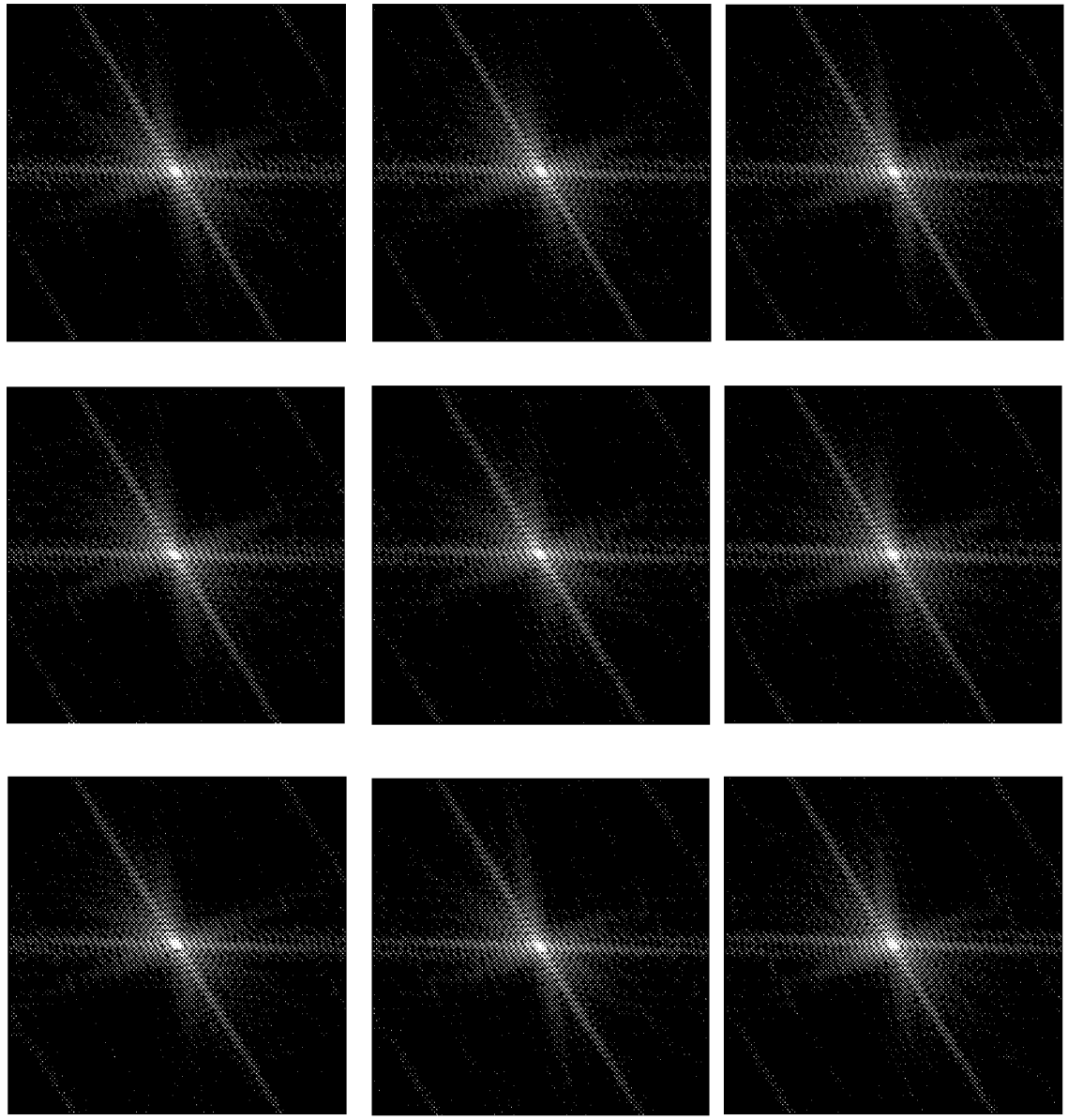

FIG. 11a shows a simulated graphical depiction of Point Spread Functions (PSFs) formed by imaging sub-system 300A of prior art diffraction limited optical system 300. Note that the scale of the images shown in FIGS. 11a-11c is such that each individual square PSF image measures approximately 200 microns across and 200 microns tall. The top-left spot diagram in FIG. 11a shows the diffraction PSF formed by imaging sub-system 300A by rays that are incident upon prior art diffraction limited optical system 300 at an angle of −1.6 degrees in the horizontal direction and +1.2 degrees in the vertical direction. The top-center spot diagram in FIG. 11a shows the diffraction PSF formed by imaging sub-system 300A by rays that are incident upon prior art diffraction limited optical system 300 at an angle of 0 degrees in the horizontal direction and +1.2 degrees in the vertical direction. The top-right spot diagram in FIG. 11a shows the diffraction PSF formed by imaging sub-system 300A by rays that are incident upon prior art diffraction limited optical system 300 at an angle of +1.6 degrees in the horizontal direction and +1.2 degrees in the vertical direction.

The middle-left spot diagram in FIG. 11a shows the diffraction PSF formed by imaging sub-system 300A by rays that are incident upon prior art diffraction limited optical system 300 at an angle of −1.6 degrees in the horizontal direction and 0 degrees in the vertical direction. The middle-center spot diagram in FIG. 11a shows the diffraction PSF formed by imaging sub-system 300A by rays that are incident upon prior art diffraction limited optical system 300 at an angle of 0 degrees in the horizontal direction and 0 degrees in the vertical direction. The middle-right spot diagram in FIG. 11a shows the diffraction PSF formed by imaging sub-system 300A by rays that are incident upon prior art diffraction limited optical system 300 at an angle of +1.6 degrees in the horizontal direction and 0 degrees in the vertical direction.

The bottom-left spot diagram in FIG. 11a shows the diffraction PSF formed by imaging sub-system 300A by rays that are incident upon prior art diffraction limited optical system 300 at an angle of −1.6 degrees in the horizontal direction and −1.2 degrees in the vertical direction. The bottom-center spot diagram in FIG. 11a shows the diffraction PSF formed by imaging sub-system 300A by rays that are incident upon prior art diffraction limited optical system 300 at an angle of 0 degrees in the horizontal direction and −1.2 degrees in the vertical direction. The bottom-right spot diagram in FIG. 11a shows the diffraction PSF formed by imaging sub-system 300A by rays that are incident upon prior art diffraction limited optical system 300 at an angle of +1.6 degrees in the horizontal direction and −1.2 degrees in the vertical direction.

Similarly, FIG. 11b shows a graphical depiction of diffraction PSFs formed by individual imaging sub-system 300B of diffraction limited prior art system 300, and FIG. 11c shows a graphical depiction of diffraction PSFs formed by individual imaging sub-system 300C of diffraction limited prior art optical system 300. The PSF layouts are identical to those shown in FIG. 11a. The fact that the PSF for each particular field point, for example the top-center field point, is substantially different for one imaging subsystem 300A (as shown in FIG. 11a) and the other imaging subsystems 300B (as shown in FIG. 11b) and 300C (as shown in FIG. 11c) graphically demonstrates the shortcomings of the prior art in the field of diffraction limited multiple-imaging systems. Because prior art optical system 300 comprises a beam-splitting apparatus 302 comprising wedge-shaped individual sub-apertures, it produces differently-shaped, differently-sized, and/or differently-oriented blur spots for out-of-focus points in each of the images formed by the three imaging sub-systems 300A, 300B, and 300C.

Figure 12:
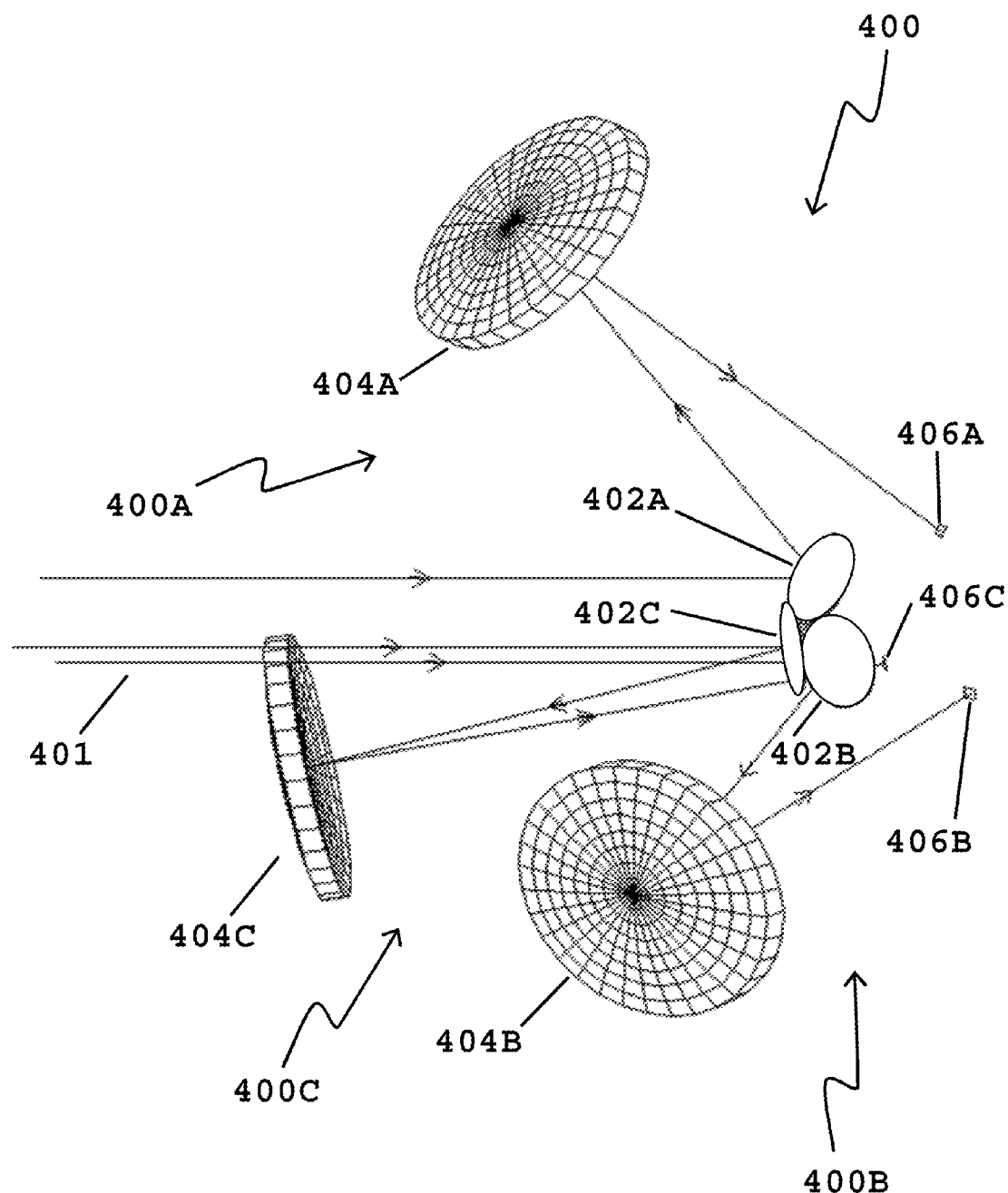
FIGS. 12-14 are perspective, side, and end views respectively of a diffraction limited embodiment of the invention.
Figure 13:
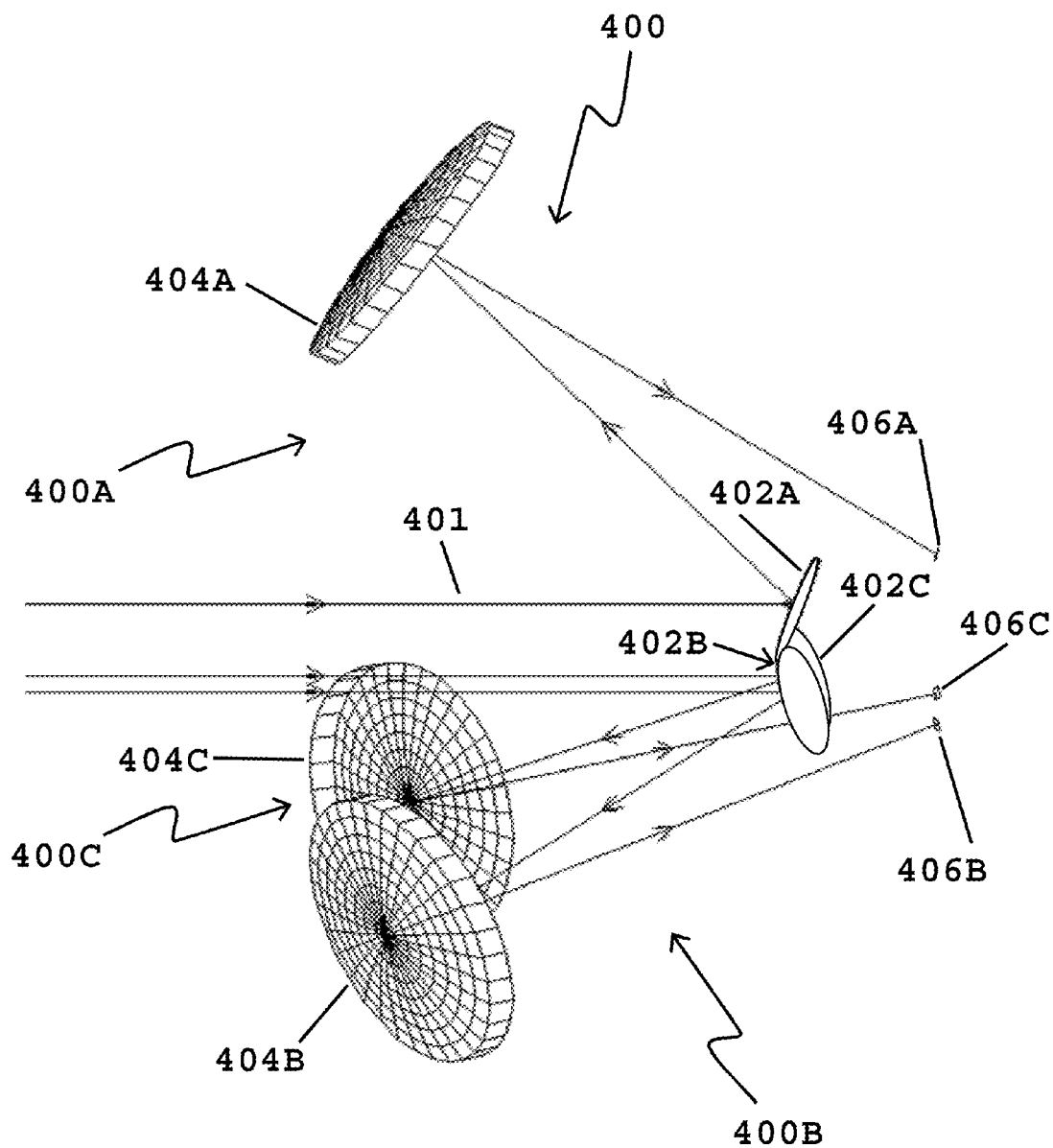
Figure 14:
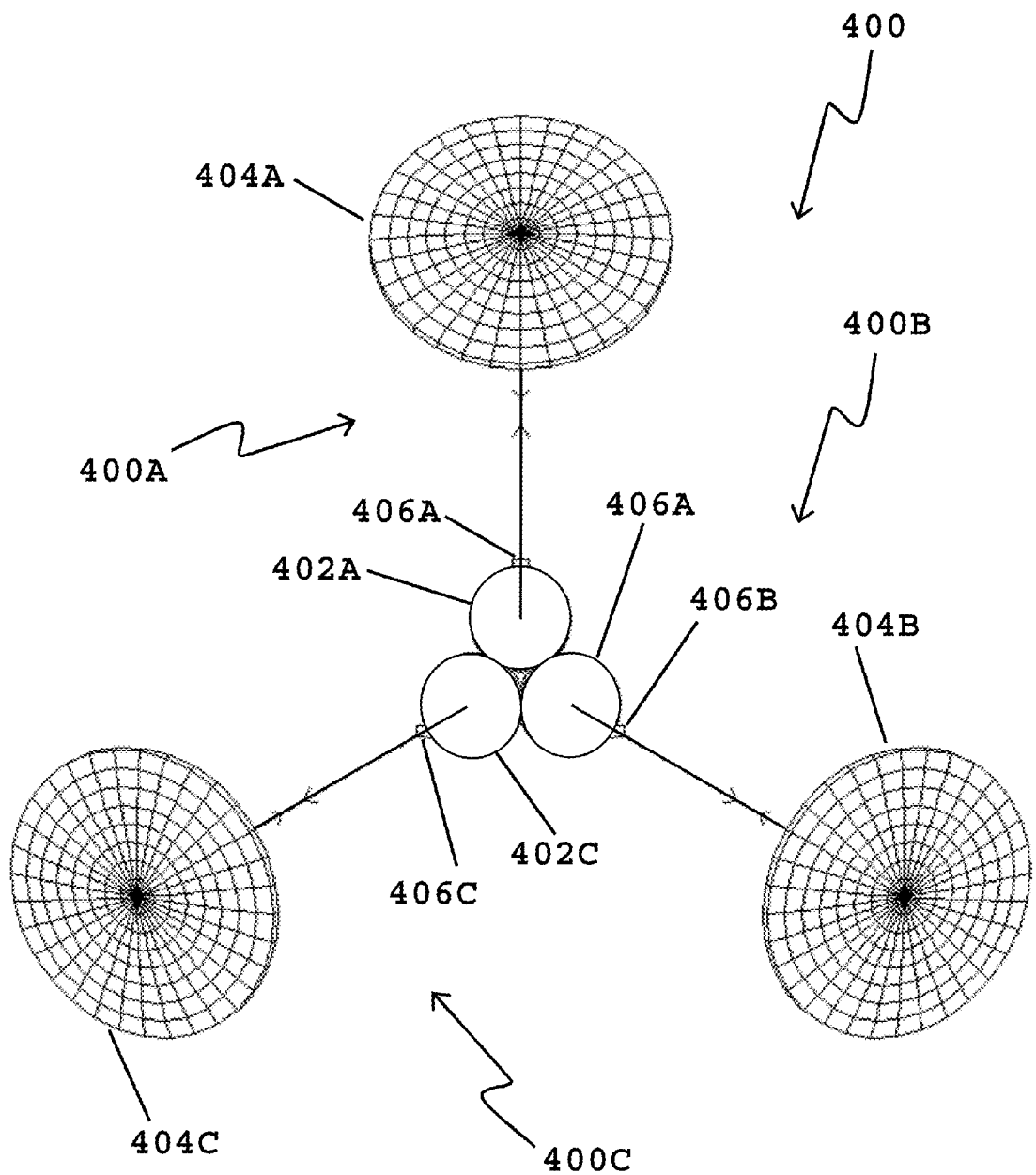

FIGS. 12, 13, and 14 respectively show a perspective view, a side view, and an end view respectively of diffraction limited embodiment of the invention 400 which comprises three separate, substantially identical imaging mirror systems, or arms 400A, 400B, and 400C. Although three arms are shown, any number may be employed. Optical radiation 401 from a distant object reflects from mirrors 402A, 402B, and 402C, which are optionally curved or flat, and is thereafter caused by mirrors 404A, 404B, and 404C, which are also optionally curved, to form substantially identical images on each of three detector planes 406A, 406B, and 406C, respectively. The first imaging mirror system comprises mirror 402A, which is preferably curved and elliptical-shaped, 404A, and detector plane 406A. Similarly, the second imaging mirror system comprises mirror 402B, mirror 404B, and detector plane 406B, and the third imaging mirror system comprises mirror 402C, mirror 404C, and a detector plane 406C.

Mirrors 402A, 402B, and 402C are preferably placed at a location that is an aperture stop, or equivalently an image of the aperture stop (a pupil), of the entire imaging system. Each mirror, or individual reflective element, may also be referred to as a sub-aperture. Thus this embodiment exhibits no vignetting (field-dependent obscuration of a portion of the light reaching the detector). A pupil relay system, which would contain an aperture stop of its own and which would relay an image of that aperture stop to a plane substantially coincident with the location of mirrors 402A, 402B, and 402C, or any other fore-optic system that provides an aperture stop at a location substantially coincident with the mirrors 402A, 402B, and 402C, may optionally be added to this embodiment 400 of the invention without significantly affecting its operation. Such an additional fore-optic or pupil relay system could be used to increase the overall system field-of-view, for example.

Figure 15:
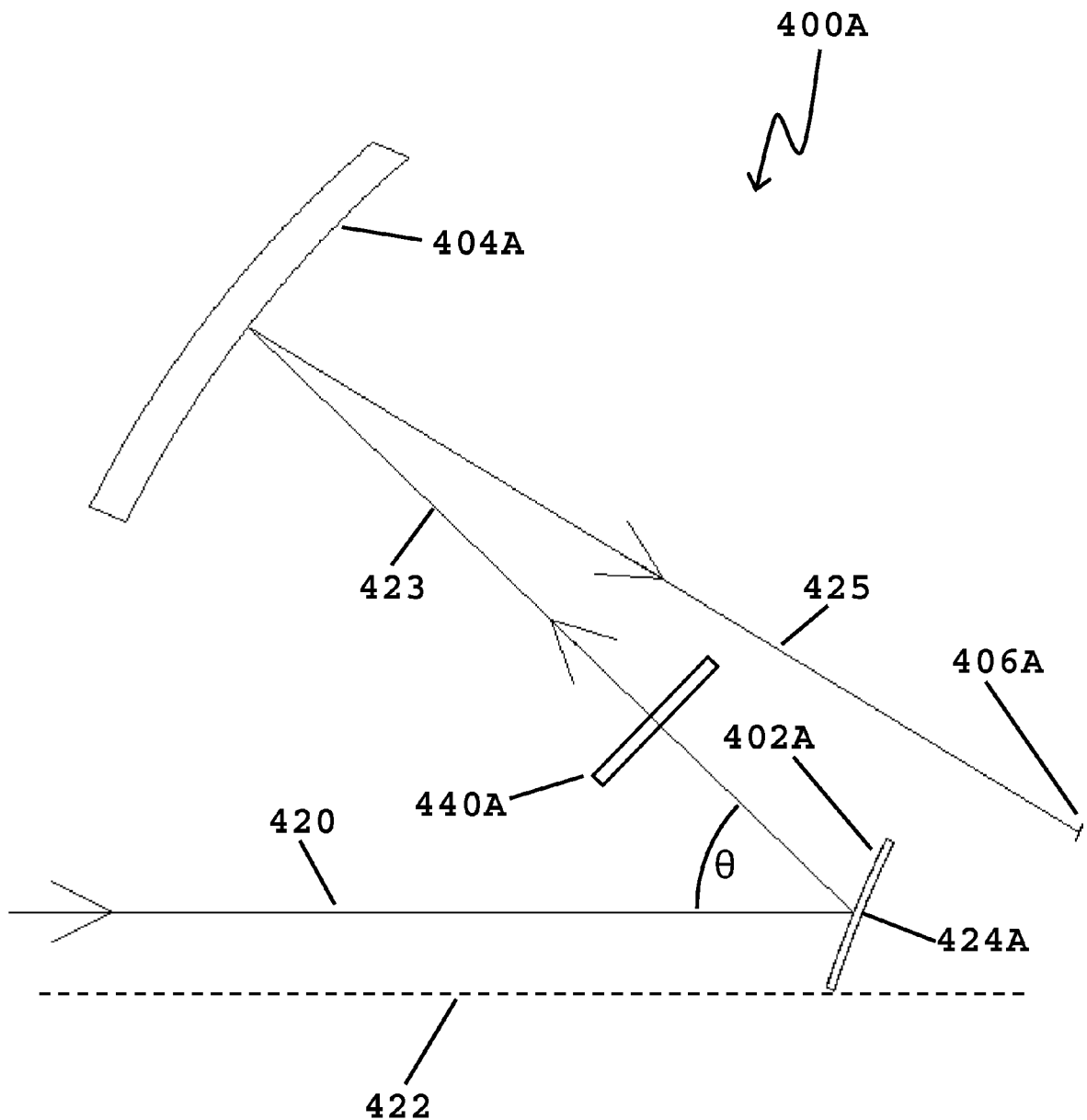
FIG. 15 is a side view of a single arm of the embodiment of the invention shown in FIGS. 12-14.

FIG. 15 shows a side view of a single arm 400A of the diffraction limited embodiment of the invention 400. In this embodiment there are three such single arms, each identical in form and function to the single arm 400A and each separated from another single arm by a rotation of 120 degrees around an axis of symmetry 422. Axis of symmetry 422 is preferably coincident with the direction of incoming optical radiation 401 and intersects a point equidistant between mirrors 402A, 402B, and 402C. Initial optical axis 420 of this single arm 400A is at first parallel to axis of symmetry 422, and then after reflection from mirror 402A optical axis 423 continues at an angle of θ=45 degrees relative to its original orientation. After reflection from mirror 404A, optical axis 425 further continues to detector plane 406A, where an image is formed.

In this embodiment 400, three substantially spatially-identical images are caused to form on the three detector planes 406A, 406B, and 406C. Because the arms, or imaging systems, which comprise mirrors 404A, 404B, 404C, in this embodiment are each diffraction-limited in performance, this result holds even though each of the arms or imaging subsystems is optionally not rotationally symmetric and optionally comprises one or more off-axis reflective mirrors. The imaging systems for diffraction limited embodiments may alternatively comprise flat or curved on-axis or rotationally symmetric mirrors or lenses or combinations thereof.

In diffraction limited embodiment 400, optical filter 440A may optionally be disposed between the mirror 402A and mirror 404A. The exact location of optical filter 440A is not important as long as it is located so that it acts only on the light that is used in the single arm 400A to form an image on detector 406A and so that it does not act on light that is used to form images on the other detectors 406B and 406C. For example, the optical filter 440A may alternatively be placed in a location that is substantially similar to the location of mirror 402A.

An example of this embodiment in accordance with FIGS. 12-15 (without optional optical filter 440A) was simulated, wherein center 424A of mirror 402A was displaced upward from the axis of symmetry 422 by a distance of 11.547 mm (in a direction perpendicular to axis of symmetry 422), which corresponds to a mirror 402A with a minor-axis diameter of 20.0 mm. The normal to the elliptical mirror face, at its vertex, was tilted upward at an angle of 22.5 degrees from initial optical axis 420. Mirror 402A was curved and elliptical-shaped, and was a convex even asphere with a radius of curvature of 310.4 mm, a conic constant of 15.5, $\alpha_4 = -3.75\text{e-}8$ $\text{mm}^{-3}$, and $\alpha_6 = -1.5\text{e-}11$ $\text{mm}^{-5}$. The shape of mirror 404A was also curved and elliptical, forming a concave even asphere with a radius of curvature of 302.1 mm, a conic constant of 0.17, $\alpha_4 = 3.94\text{e-}12$ $\text{mm}^{-3}$, and $\alpha_6 = 2.77\text{e-}15$ $\text{mm}^{-5}$. The optical vertex, or mathematical center of mirror 404A was located more than 80 mm below the location of the intersection of the two optical axes 423 and 425. Thus mirror 404A is an "off-axis" mirror. Off-axis mirrors are often used in imaging lens and telescope systems, and are typically not rotationally symmetric about their physical centers.

Figure 16A:
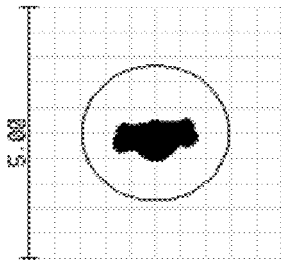
FIGS. 16a-16c are simulated graphical depictions of geometric aberration spot diagrams respectively formed by the three individual imaging sub-systems of and example of the embodiment of the invention shown in FIGS. 12-15.
Figure 16A:
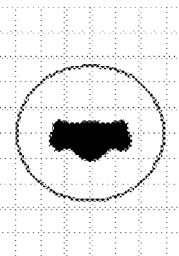
Figure 16A:
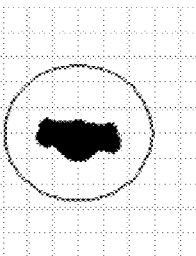
Figure 16A:
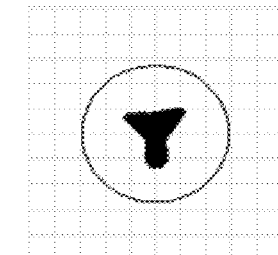
Figure 16A:
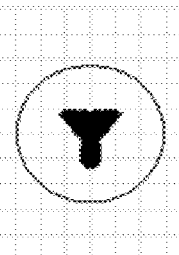
Figure 16A:
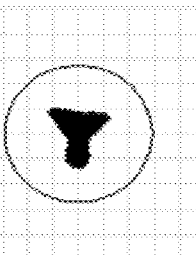
Figure 16A:
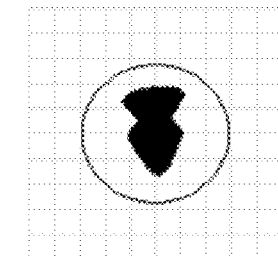
Figure 16A:
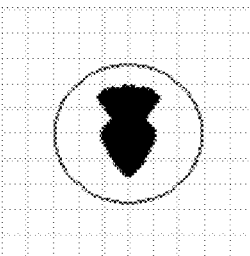
Figure 16A:
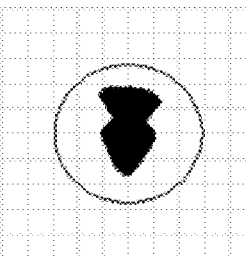

FIG. 16a shows a graphical depiction of a computer simulation of geometric aberration spot diagrams formed by individual imaging sub-system 400A of the above example of diffraction limited embodiment of the invention 400. The top-left spot diagram in FIG. 16a shows the geometric aberration spot diagram formed on detector plane 406A by rays that are incident upon diffraction limited embodiment system 400 at an angle of −1.6 degrees in the horizontal direction and +1.2 degrees in the vertical direction. The top-center spot diagram in FIG. 16a shows the geometric aberration spot diagram formed on detector plane 406A by rays that are incident upon diffraction limited embodiment system 400 at an angle of 0 degrees in the horizontal direction and +1.2 degrees in the vertical direction. The top-right spot diagram in FIG. 16a shows the geometric aberration spot diagram formed on detector plane 406A by rays that are incident upon diffraction limited embodiment system 400 at an angle of +1.6 degrees in the horizontal direction and +1.2 degrees in the vertical direction.

The middle-left spot diagram in FIG. 16a shows the geometric aberration spot diagram formed on detector plane 406A by rays that are incident upon diffraction limited embodiment system 400 at an angle of −1.6 degrees in the horizontal direction and 0 degrees in the vertical direction. The middle-center spot diagram in FIG. 16a shows the geometric aberration spot diagram formed on detector plane 406A by rays that are incident upon diffraction limited embodiment system 400 at an angle of 0 degrees in the horizontal direction and 0 degrees in the vertical direction. The middle-right spot diagram in FIG. 16a shows the geometric aberration spot diagram formed on detector plane 406A by rays that are incident upon diffraction limited embodiment system 400 at an angle of +1.6 degrees in the horizontal direction and 0 degrees in the vertical direction.

The bottom-left spot diagram in FIG. 16a shows the geometric aberration spot diagram formed on detector plane 406A by rays that are incident upon diffraction limited embodiment system 400 at an angle of −1.6 degrees in the horizontal direction and −1.2 degrees in the vertical direction. The bottom-center spot diagram in FIG. 16a shows the geometric aberration spot diagram formed on detector plane 406A by rays that are incident upon diffraction limited embodiment system 400 at an angle of 0 degrees in the horizontal direction and −1.2 degrees in the vertical direction. The bottom-right spot diagram in FIG. 16a shows the geometric aberration spot diagram formed on the detector plane 406A by rays that are incident upon diffraction limited embodiment system 400 at an angle of +1.6 degrees in the horizontal direction and −1.2 degrees in the vertical direction.

Figure 16B:
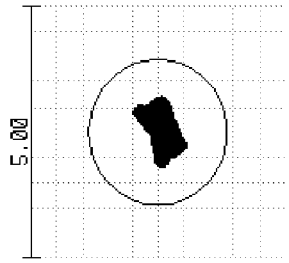
Figure 16B:
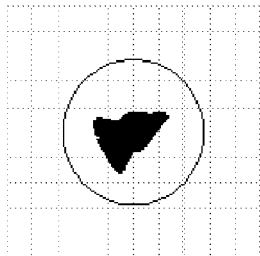
Figure 16B:
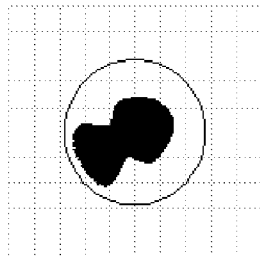
Figure 16B:
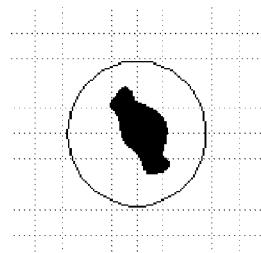
Figure 16B:
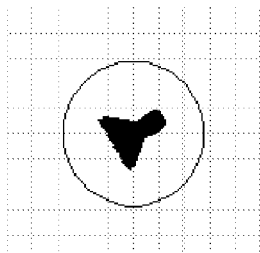
Figure 16B:
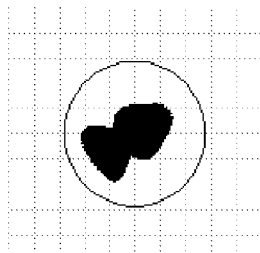
Figure 16B:
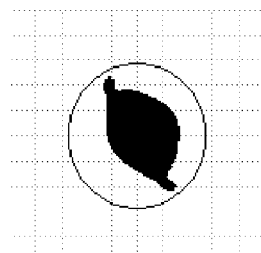
Figure 16B:
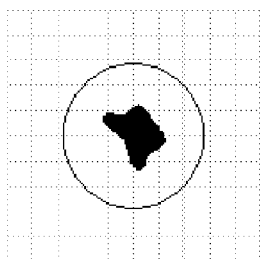
Figure 16B:
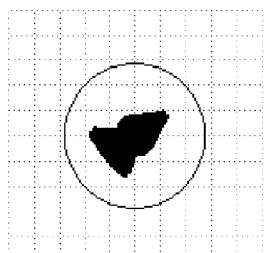
Figure 16C:
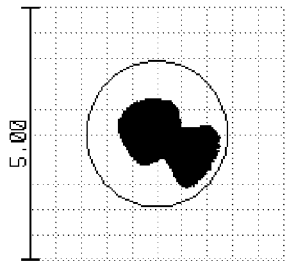
Figure 16C:
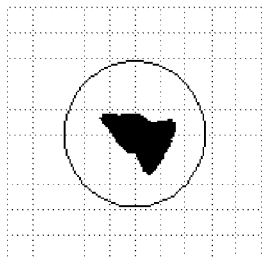
Figure 16C:
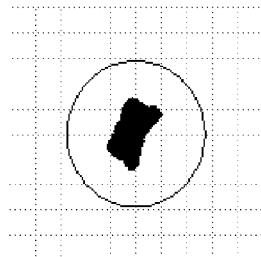
Figure 16C:
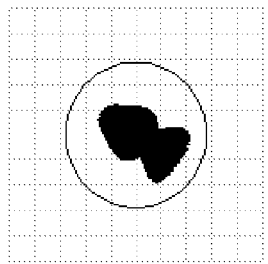
Figure 16C:
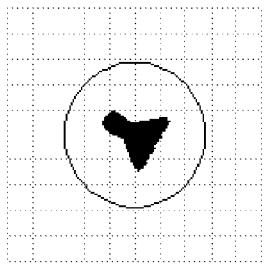
Figure 16C:
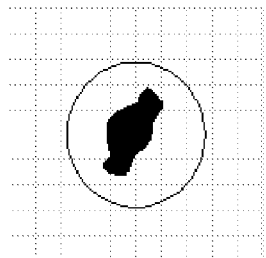
Figure 16C:
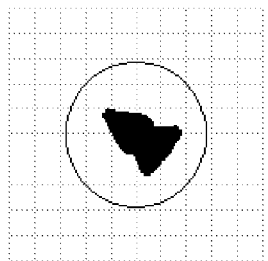
Figure 16C:
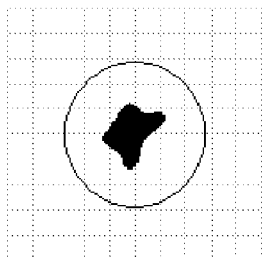
Figure 16C:
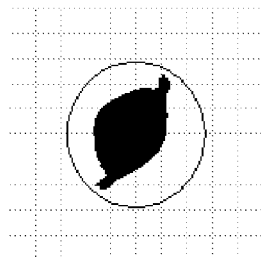

Similarly, FIG. 16b shows a graphical depiction of a computer simulation of geometric aberration spot diagrams formed by individual imaging sub-system 400B, and FIG. 16c shows a graphical depiction of a computer simulation of geometric aberration spot diagrams formed by imaging sub-system 400C. The layouts of spot diagrams in FIGS. 16b and 16c are identical to the layout described for FIG. 16a. The geometric aberration spot diagrams shown in FIGS. 16a-16c are small in size, typically measuring less than 1 micron in this case, compared to size of the diffraction spot, or so-called "Airy disc," which is represented by the circles having a diameter of approximately 3 microns in the figures. This shows that the imaging performance of this embodiment is "diffraction limited", i.e. that the geometric aberrations are negligible compared to the size of the Airy disc and do not contribute significantly to the image formed. Thus the imaging performance of this embodiment of the invention is dependent only upon the diffraction spot diagrams, or Point Spread Functions (PSFs), of the individual imaging arms 400A, 400B, and 400C. The shapes of the individual PSFs are dependent only upon the shapes and orientations of the sub-apertures of each of the individual imaging arms 400A, 400B, and 400C, so each individual imaging arm is no longer restricted to being rotationally symmetric, and each of the individual sub-apertures is no longer restricted to being shaped such that it is (i*n) ways rotationally symmetric, where i is any integer number and n is the number of imaging planes. The only requirement for the shapes of the sub-apertures for this diffraction limited embodiment is that the sub-apertures have substantially the same size, shape, and orientation with respect to the incoming optical radiation 401.

Figure 17A:
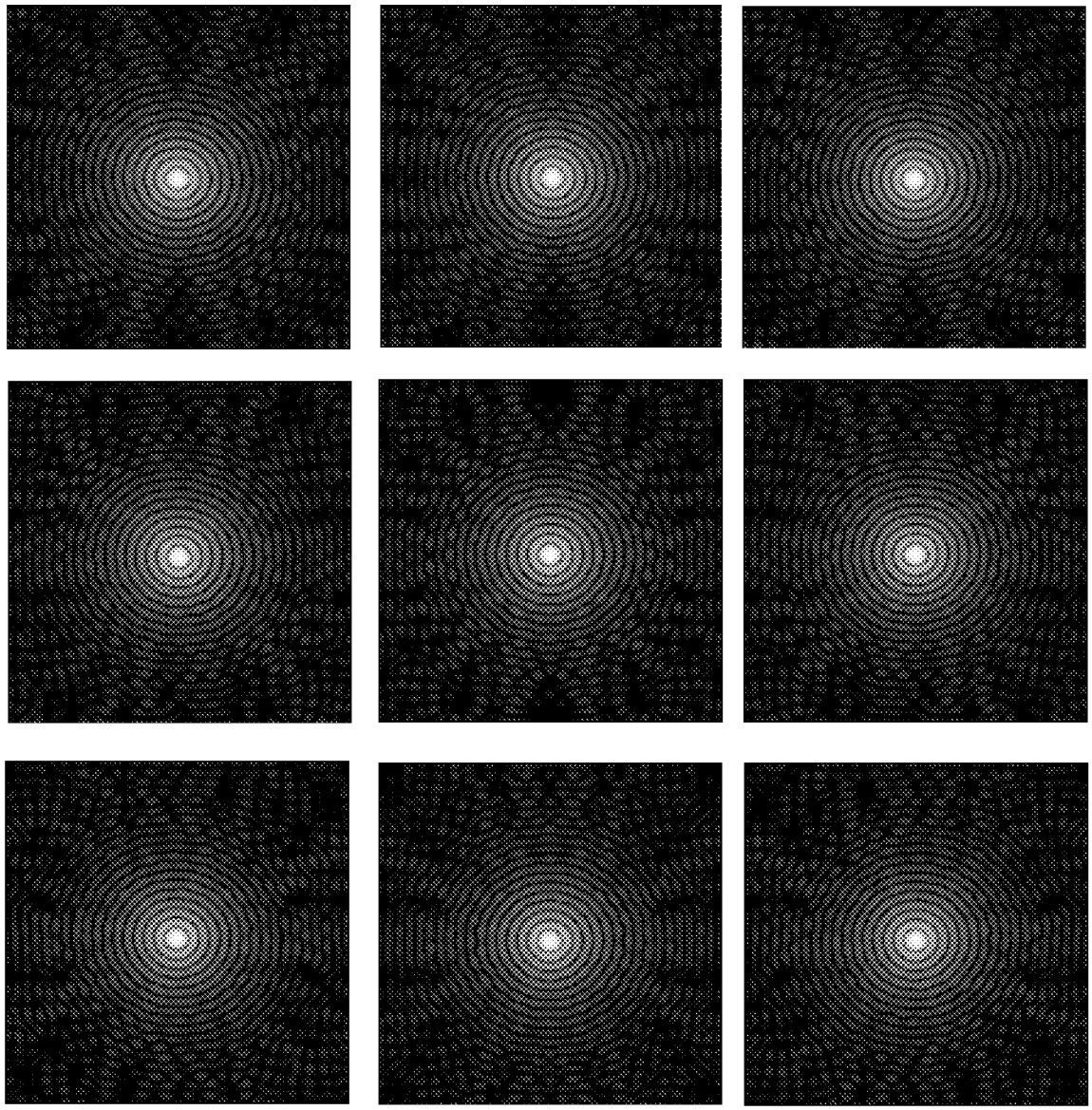
FIGS. 17a-17c are simulated graphical depictions of Point Spread Functions respectively formed by the three individual imaging sub-systems of an example of the embodiment of the invention shown in FIGS. 12-15.
Figure 17B:
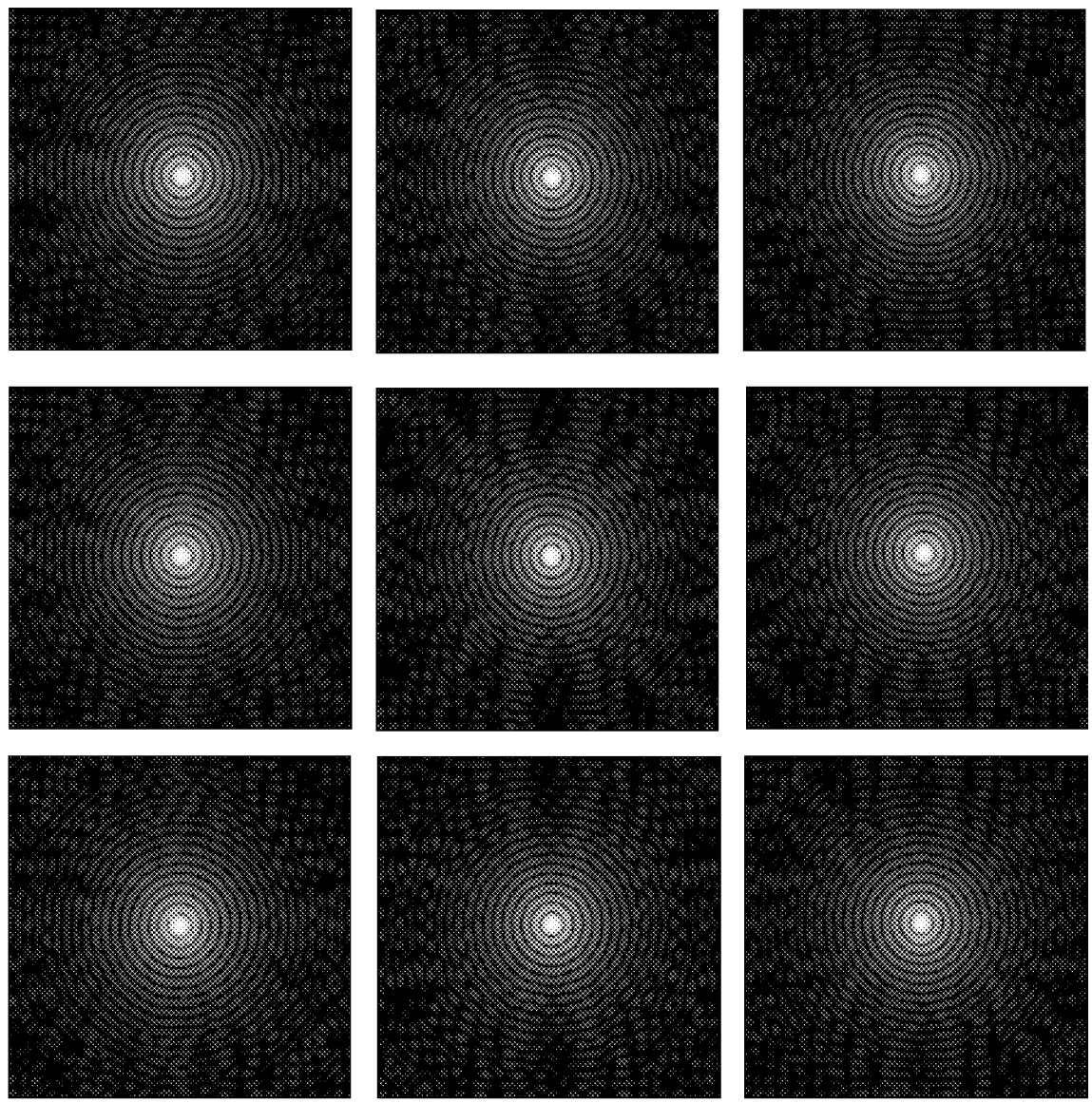
Figure 17C:
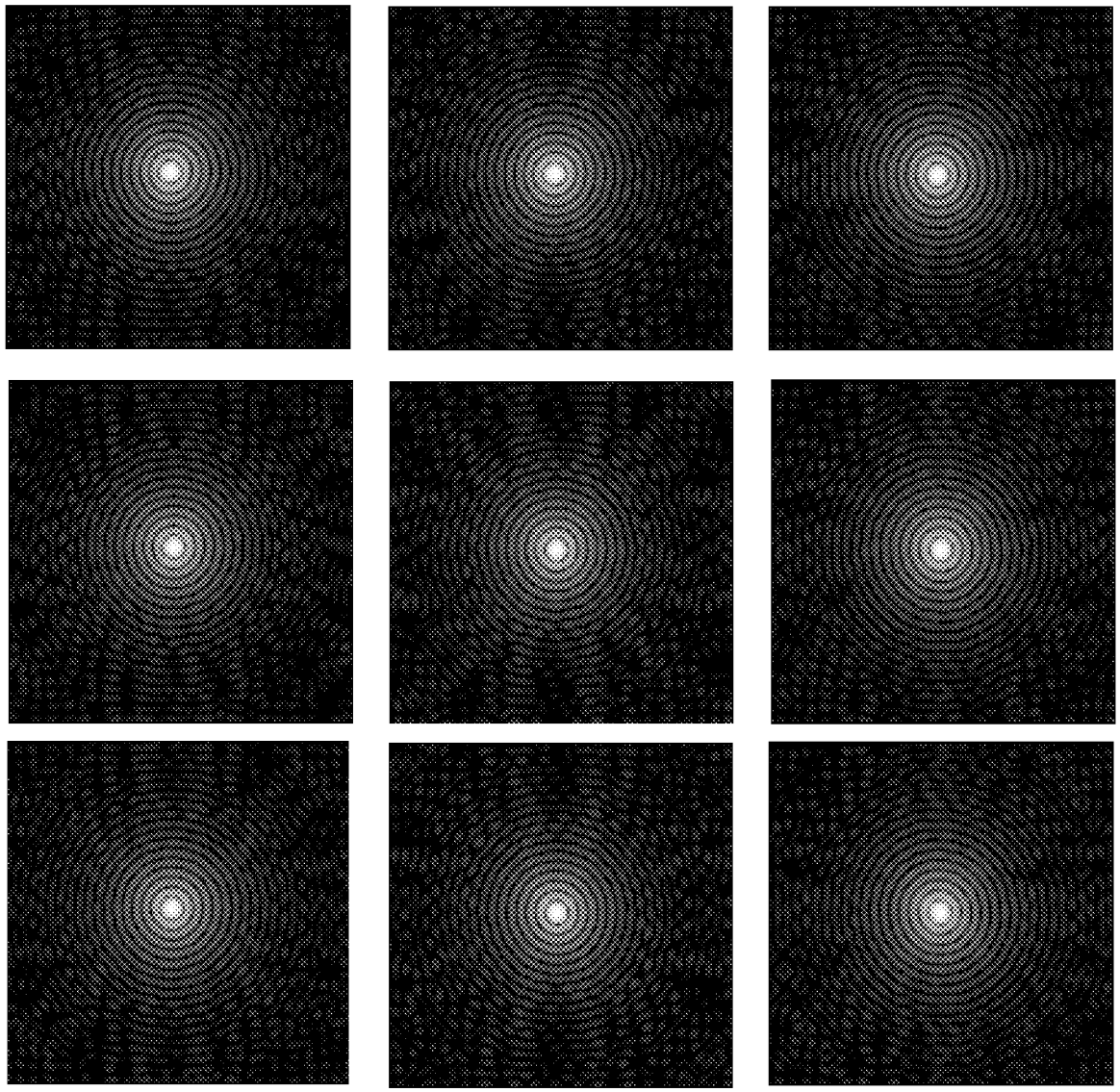

FIGS. 17a-17c show graphical depictions of Point Spread Functions (PSFs) formed by individual imaging sub-systems 400A, 400B, 400C respectively of the above example of diffraction limited embodiment 400. The layout of PSFs in each of FIGS. 17a-17c is identical to the layout of the geometric aberration spot diagrams described for FIG. 16a. Note that the scale of the images shown in FIGS. 17a-17c is such that each individual square PSF image measures approximately 100 microns across and 100 microns tall. The innermost circle on each PSF corresponds to the circle on each spot diagram shown in FIGS. 16a-16c. Unlike the prior art PSFs shown in FIGS. 11a-11c, the corresponding PSF's in FIGS. 17a-17c are substantially identical in shape, size, and orientation. Thus the images formed of an object scene on detector planes 406A, 406B, and 406C are practically identical, down to the sub-pixel level.

Figure 18A:
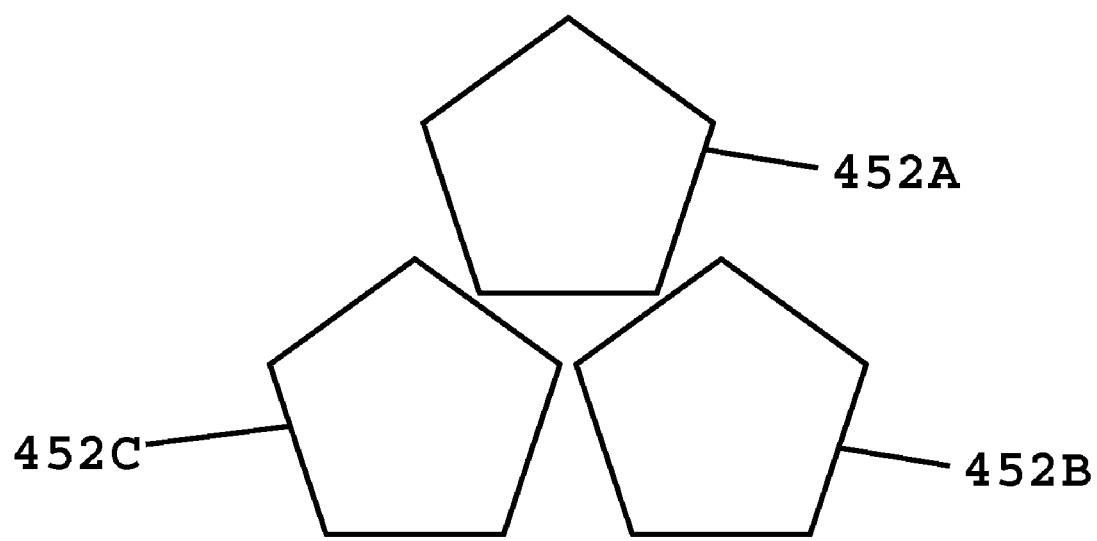
FIGS. 18*a*-18*c* show differently shaped sets of mirrors suitable for use with the embodiment of the invention shown in FIGS. 12-15.
Figure 18B:
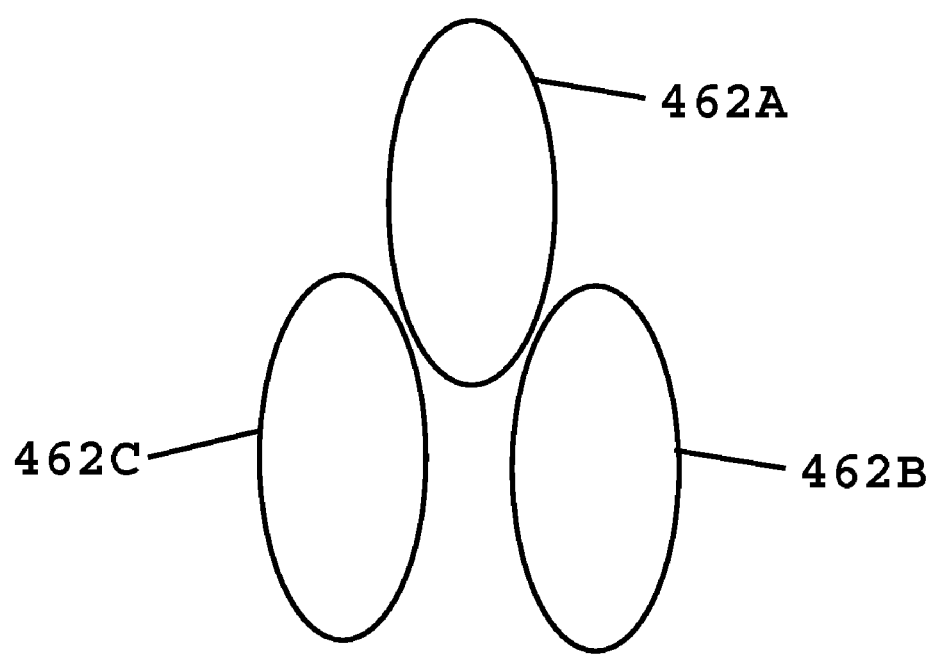
Figure 18C:
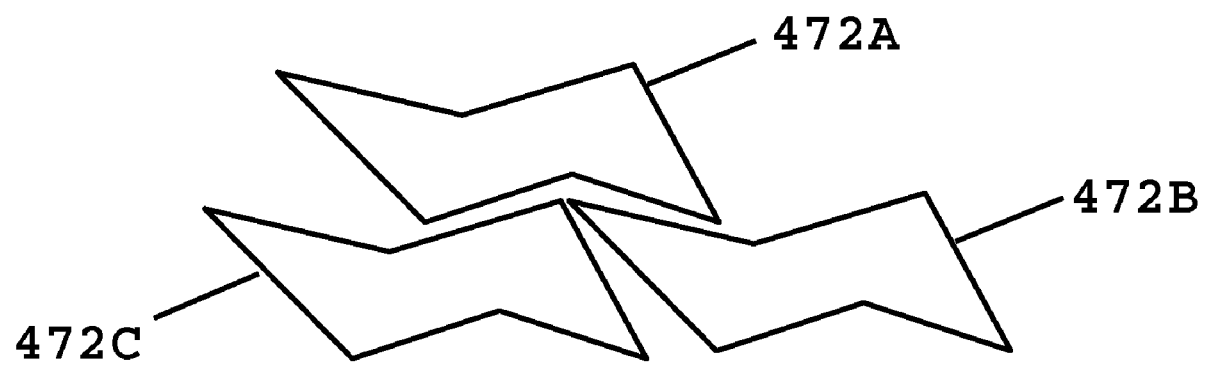

FIGS. 18a-18c all show examples of sub-aperture shapes that may be used with the diffraction limited embodiment of the invention 400 to yield spatially identical images at all three of the detector planes 406A, 406B, and 406C. FIG. 18a shows three mirrors 452A, 452B, 452C that have a pentagon shape when viewed in a direction substantially similar to the direction of the incoming optical radiation 401. FIG. 18b shows three mirrors 462A, 462B, 462C that have an upright oval shape when viewed in a direction substantially similar to the direction of the incoming optical radiation 401. FIG. 18c shows three mirrors 472A, 472B, 472C, that have an irregular shape when viewed in a direction substantially similar to the direction of the incoming optical radiation 401. The actual cross sections of the mirrors in each figure each have substantially the same size, shape, and orientation with respect to the incoming optical radiation, but they aren't necessarily rotationally symmetric, which means that the images formed on detector planes 406A, 406B, 406C are substantially identical. Each set of mirrors may replace mirrors 402A, 402B, 402C in diffraction limited preferred embodiment 400 that are shown in FIG. 14 as having a circular shape as seen by incoming radiation 401.

FIGS. 18a-18c show the use of mirrors having the same size, shape, or orientation. However, similar to the non-diffraction limited embodiment described above, one or more masks may be used in combination with mirrors (or other reflective beam-splitting elements) that do not have the same size, shape, and/or orientation to form the appropriate actual cross sections for each arm.

In the above simulation examples, specific dimensions, shapes, and materials properties were chosen. However, other examples can achieve the same results with the use of different dimensions, shapes, and materials properties.

Although the invention has been described in detail with particular reference to these embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for producing multiple diffraction limited images, the method comprising the steps of:
    splitting an optical beam into a plurality of images using a plurality of beam-splitting elements, the beam-splitting elements comprising actual cross sections each having substantially the same size, shape, and orientation, wherein at least one beam splitting element is partially masked; and
    imaging the images using a plurality of imaging systems; wherein each imaging system comprises an off-axis curved mirror.

2. The method of claim 1 wherein the splitting step comprise splitting the beam substantially at an aperture stop or pupil of an entire optical system.

3. The method of claim 1 wherein each beam splitting element comprises a reflective element comprising a mirror or a facet of a reflective prism.

4. The method of claim 1 wherein the plurality of images are substantially identical.

5. The method of claim 1 further comprising the step of filtering at least one of the plurality of images through a neutral density filter, a wavelength filter, and/or a polarizing filter.

6. The method of claim 1 wherein distances between the beam-splitting elements and corresponding image planes are different.

7. A diffraction limited system for producing multiple images, the system comprising:
    a plurality of beam splitting elements comprising actual cross sections each having substantially the same size, shape, and orientation;
    a plurality of imaging systems, each imaging system comprises an off-axis curved mirror; and
    a plurality of detectors for imaging a plurality of images.

8. The system of claim 7 wherein said beam splitting elements are disposed substantially at an aperture stop or pupil of the system.

9. The system of claim 7 wherein each of said beam splitting elements is reflective and comprises a mirror or a facet of a prism.

10. The system of claim 7 further comprising at least one mask for masking the beam splitting elements.

11. The system of claim 7 wherein said plurality of images are substantially identical.

12. The system of claim 7 further comprising at least one neutral density filter, wavelength filter, and/or polarizing filter disposed at an afocal or collimated space.

13. The system of claim 7 wherein each distance between a beam-splitting element and a corresponding detector is different.

* * * * *